US012731890B2

(12) United States Patent
Jadidian et al.

(10) Patent No.: US 12,731,890 B2
(45) Date of Patent: Sep. 8, 2026

(54) RETRODIRECTIVE SURFACE MOUNT ANTENNAS

(71) Applicant: MICROSOFT TECHNOLOGY LICENSING, LLC, Redmond, WA (US)

(72) Inventors: Jouya Jadidian, Los Gatos, CA (US); Mohammad Mustafa Malik, Snoqualmie, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 297 days.

(21) Appl. No.: 18/109,065

(22) Filed: Feb. 13, 2023

(65) Prior Publication Data

US 2024/0275040 A1 Aug. 15, 2024

(51) Int. Cl.
*H01Q 3/26* (2006.01)
*H01Q 5/314* (2015.01)

(52) U.S. Cl.
CPC ........... *H01Q 3/2647* (2013.01); *H01Q 5/314* (2015.01)

(58) Field of Classification Search
CPC ............................. H01Q 3/2647; H01Q 5/314
See application file for complete search history.

(56) References Cited

U.S. PATENT DOCUMENTS 3,518,672 A * 6/1970 Zimmer .................. G01S 13/82 343/705
10,511,100 B2 * 12/2019 Hester .................. H01Q 21/065
12,158,515 B2 * 12/2024 Jadidian ................ G06F 3/0346
2010/0066590 A1 * 3/2010 Brown ................. H01Q 3/2605 342/147
2012/0001735 A1 1/2012 Fink
2012/0289338 A1 * 11/2012 Chen ....................... G06F 3/038 463/39
2013/0162460 A1 * 6/2013 Aryanfar ............... G01S 13/767 342/42
2014/0253380 A1 * 9/2014 Choi .................... H04B 7/0689 342/367
2018/0031694 A1 * 2/2018 Kuo ..................... G05D 1/0094

(Continued)

FOREIGN PATENT DOCUMENTS

DE 102021110011 B4 * 9/2022 ........... H01Q 3/2647
EP 3276373 A1 * 1/2018 ............. G01S 13/88

(Continued)

OTHER PUBLICATIONS

Farzami, et al., "Reconfigurable Dual-Band Bidirectional Reflection Amplifier With Applications in Van Atta Array", IEEE Transactions on Microwave Theory and Techniques, vol. 65, Issue No. 11, Nov. 1, 2017, pp. 4198-4207.

(Continued)

*Primary Examiner* — Seokjin Kim
(74) *Attorney, Agent, or Firm* — Workman Nydegger

(57) ABSTRACT

Systems and methods are provided for improving a reflection signal of a radar antenna assembly. For example, disclosed embodiments are directed to a multiple retrodirective surface mount antenna assembly comprising a plurality of retrodirective antenna arrays, each retrodirective antenna array being angularly offset from at least one other retrodirective antenna array and being configured to reflect a radar signal received from a radar signal source to a radar signal receiver.

20 Claims, 20 Drawing Sheets

(56) References Cited

U.S. PATENT DOCUMENTS

| | | | | |
|---|---|---|---|---|
| 2018/0361232 | A1* | 12/2018 | Mallinson | A63F 13/98 |
| 2019/0265473 | A1* | 8/2019 | Shahmohammadi | G02B 27/017 |
| 2021/0033719 | A1* | 2/2021 | Hamasaki | G01S 13/872 |
| 2021/0156986 | A1 | 5/2021 | Shee | |
| 2021/0232235 | A1* | 7/2021 | Regani | G06F 3/0346 |
| 2023/0072423 | A1* | 3/2023 | Osborn | G16H 20/30 |
| 2023/0306213 | A1* | 9/2023 | Hester | G06K 19/07773 |
| 2024/0095877 | A1* | 3/2024 | Liu | G06V 20/44 |
| 2024/0162993 | A1* | 5/2024 | Khalaf | H04B 17/318 |

FOREIGN PATENT DOCUMENTS

| | | | | |
|---|---|---|---|---|
| EP | 4220864 | A1 * | 8/2023 | H01Q 21/061 |
| WO | WO-2013019847 | A1 * | 2/2013 | G01S 7/352 |
| WO | WO-2019185676 | A1 * | 10/2019 | H01Q 3/2682 |
| WO | WO-2021172614 | A1 * | 9/2021 | H04B 10/29 |

OTHER PUBLICATIONS

International Search Report and Written Opinion received for PCT Application No. PCT/US2024/013637 (MS#412572-PCT01), May 21, 2024, 19 pages.

Lipuma, et al., "RCS enhancement of flattened dihedral corner reflector using reflectarray approach", Electronics Letters, vol. 49, Issue No. 2, Jan. 17, 2013, 2 pages.

Nadeem, et al., "Van Atta Arrays Exploited Towards Flying UAV Position Detection", IEEE, 2021, Dec. 4-10, 2021, pp. 1927-1928.

Srour, et al., "Analysis of the retrodirective mechanism of a flattened dihedral", IET Microwaves, vol. 12, Issue No. 5, Apr. 18, 2018, pp. 699-705.

International Preliminary Report on Patentability (Chapter I) received for PCT Application No. PCT/US2024/013637 (MS# 412572-PCT01), Aug. 28, 2025, 13 pages.

* cited by examiner

Single Antenna Array $$(Equation\ 1)\ S_{11} = \frac{Reflected\ Power}{Incident\ Power} = \frac{V^-}{V^+} = \frac{Z_L - Z_S}{Z_L + Z_S}$$

$$(Equation\ 2)\ Z_L = Z_S \frac{(1 + S_{11})}{(1 - S_{11})}$$

RETRODIRECTIVE SURFACE MOUNT ANTENNAS

BACKGROUND

Mixed-reality systems, such as virtual reality systems and augmented reality systems have received significant attention because of their ability to create unique experiences for their users. Virtual reality systems provide experiences in which a user is fully immersed in a virtually represented world, typically through a virtual reality headset or head-mounted device (HMD) that prevents the user from seeing objects located in the user's real environment. Augmented reality systems provide a user with experiences that allow the user to interact with both virtual content and real objects located in the user's environment. For example, virtual objects are virtually presented to the user within the user's own real environment such that the user is able to perceive the virtual objects in relation to physical or real objects.

Typically, users perceive or view virtual reality or augmented reality through an enclosed visual display (for virtual reality) or a transparent lens (for augmented reality). Users can interact with virtual objects in the perceived reality with various types of input controllers. Some of the controller inputs that are used by mixed-reality systems are based on position of the controllers relative to the user's headset and/or the virtual objects presented within the mixed reality environment. Accordingly, it is important for the mixed-reality system to be able to effectively track the position of the controllers in terms of both location and orientation relative to the user's display (e.g., HMD) and mixed-reality objects rendered in the mixed-reality environment.

Current methods and systems for tracking some types of user controllers can be very computationally expensive, particularly when the user controllers include active tracking components that are continuously communicating with corresponding components in the mixed-reality headset. The processing load required by these systems can cause a significant drain on batteries and other power supplies. Such loads can also cause overheating and overall degradation on the system components.

Accordingly, there is an ongoing need and desire for improved systems, methods, and devices for providing user controller tracking, and even more particularly, for improved systems, methods, and devices that can be utilized for detecting the orientation and position of the user controller relative to a mixed-reality system with a reduced computational load relative to conventional systems that utilize controllers having independent active tracking components.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices that include a multiple retrodirective surface mount antenna assembly that is, in some instances, configured to facilitate the tracking of a controller system, including but not limited to a passive tracking controller, using multiple retrodirective surface mount antenna arrays.

For example, some disclosed embodiments are directed to a multiple retrodirective surface mount antenna assembly comprising a plurality of retrodirective antenna arrays. Each retrodirective antenna array is mountable/mounted on a controller surface with each retrodirective antenna array being angularly offset from at least one other retrodirective antenna array and configured to reflect a radar signal received from a radar signal source to a radar signal receiver. The radar signal source and radar signal receiver may comprise, in some instances, a single integrated transceiver unit or assembly.

Some disclosed embodiments are also directed to a controller system comprising (i) a body or housing that is configured to be held in a hand of a user and to be moved with the hand of the user in six degrees of freedom and (ii) a multiple retrodirective surface mount antenna assembly comprising a plurality of retrodirective antenna arrays, wherein each retrodirective antenna array is mounted on a surface or component of the body/housing (on an external or internal portion of the housing), such that each retrodirective antenna array is offset at an angle from at least one other retrodirective antenna array in the mounted configuration on the controller system.

Some of the disclosed embodiments are also directed to an active retrodirective surface mount antenna array assembly comprising a retrodirective antenna array and a reflection amplifier electrically coupled with the retrodirective antenna array to facilitate an increase in an effective radar cross-section of the retrodirective antenna array.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to systems, methods, and devices that are configured to facilitate tracking of passive controller systems, and even more particularly, for systems, methods, and devices that can be utilized to track passive controller systems using a multiple retrodirective surface mount antenna assembly and an active sensor system. Some embodiments are also directed to active controller systems that include the multiple retrodirective surface mount antenna assemblies described herein.

The disclosed embodiments provide many technical advantages over existing systems, methods, and devices. For example, the design of the passive controller system is relatively inexpensive (e.g., not requiring active tracking components) and highly customizable in terms of the range of operation. Furthermore, the active sensor system is able to function on low power while still meeting signal transmission requirements. These lower power requirements, particularly for the passive controller are an improvement over devices that require power, such as controllers with powered IMU tracking components.

Beneficially, in use applications for mixed-reality systems, the passive controller system is designable as a handheld remote control that is trackable within an arm's length of the user's active sensor system (as configured as an HMD), such that the active sensor system is able to track the position and orientation (also referred to herein as pose) of the passive controller system with sub-millimeter and sub-radian accuracy.

Another technical advantage is achieved in that the disclosed passive controllers do not necessarily need line-of-sight to the active sensor system to be tracked, as the signals sent from and reflected to the active sensor system from the passive controller can sometimes pass-through materials that would obscure the camera imaging required for line-of-sight tracking.

Figure 1:
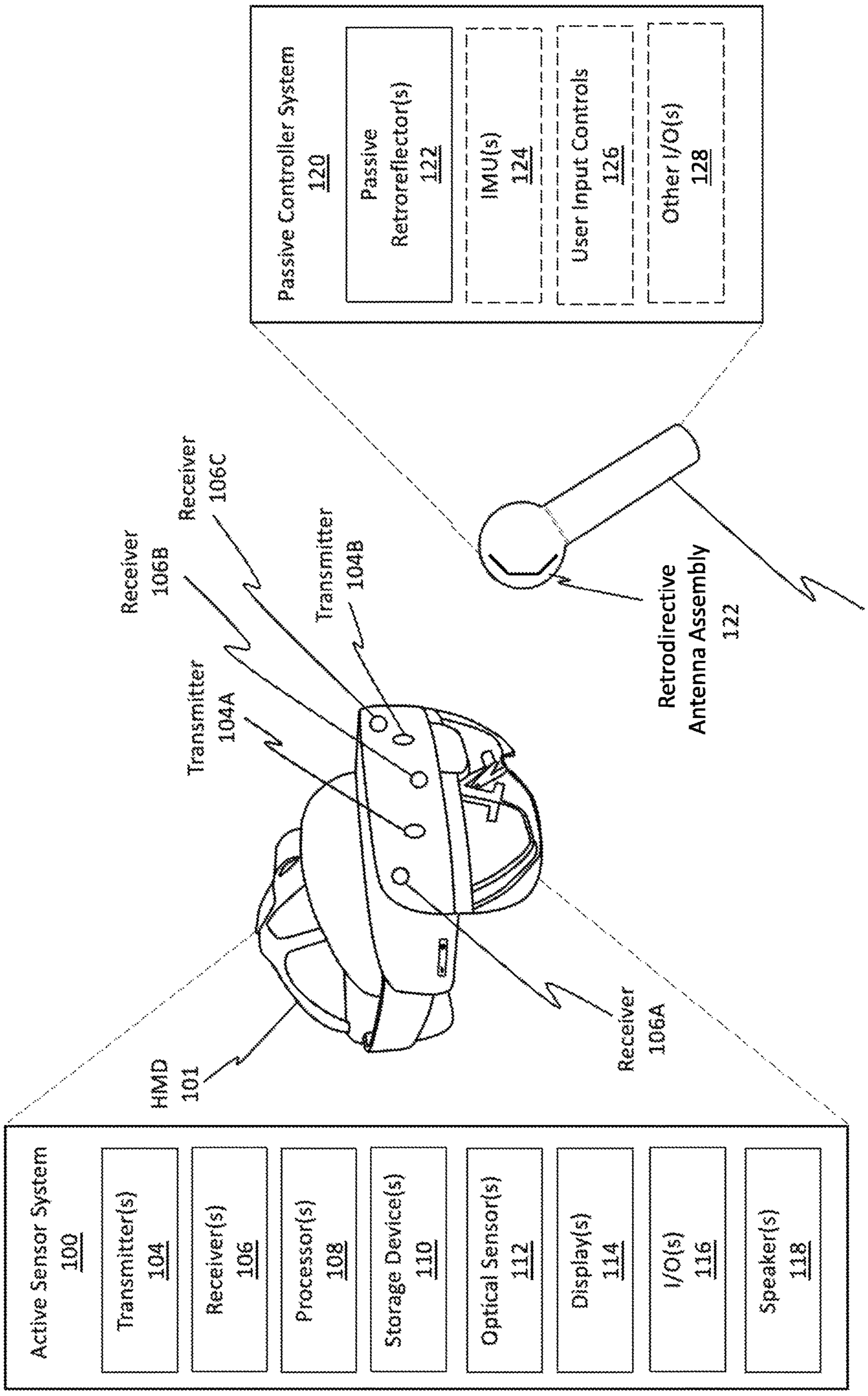
FIG. 1 illustrates an active sensor system and passive controller system that includes and/or that is capable of being utilized to implement the disclosed embodiments.

FIG. 1 illustrates an active sensor system 100 and passive controller system 120 that includes and/or that is capable of being utilized to implement the disclosed embodiments. The active sensor system 100, depicted in FIG. 1 as a head-mounted device (e.g., HMD 101) includes a plurality of transmitters 104 (e.g., transmitter 104A, transmitter 104B, and transmitter 104C) and a plurality of receivers 106 (e.g., receiver 106A and receiver 106B).

The active sensor system 100 is also illustrated as including one or more processor(s) (such as one or more hardware processor(s) 108 and a storage (i.e., storage device(s) 110) storing computer-readable instructions wherein one or more of the hardware storage device(s) 110 is able to house any number of data types and any number of computer-readable instructions by which the active sensor system 100 is configured to implement one or more aspects of the disclosed embodiments when the computer-readable instructions are executed by the one or more processor(s) 108. The active sensor system 100 is also shown including optical sensor(s) 112, display(s) 114, input/output (I/O) device(s) 116, and speaker(s) 118.

FIG. 1 also illustrates the passive controller system 120, depicted as a remote control 121, which includes a multiple retrodirective surface mount antenna assembly 122.

It is noted that a multiple retrodirective surface mount antenna assembly is interchangeably referred to as an "assembly" or "retrodirective assembly" throughout. An assembly can be passive or active. A "passive assembly" refers to a multiple retrodirective surface mount antenna assembly which does not require active or powered components to facilitate radar reflection and object tracking. An "active assembly" refers to a retrodirective antenna assembly comprising one or more retrodirective surface mount antenna arrays and an amplifier electrically coupled with at least one of the one or more retrodirective antenna arrays.

In some embodiments, the passive controller system 120 optionally includes one or more inertial measurement units (e.g., IMU(s) 124), user input controls 126 (e.g., user control buttons disposed on the remote control 121), and/or other I/O(s) 128. In some instances, other I/O(s) include haptic feedback, microphones, speakers, optical sensors, light-emitting devices (e.g., for light indicators), or other inputs/outputs.

However, it is noted that the passive controller system 120 does not need to include any IMU or other powered tracking unit to track the orientation and/or position of the controller relative to the active sensor system 100. In fact, in most preferred configurations, the passive controller system 120 does not include and/or does not use the IMU 124 to tack the positioning of the passive controller system relative to the active sensor system 100. Instead, these components (e.g., IMU 124) are merely optional and/or may be selectively used for powered and/or supplementary tracking if and/or when it is determined that there is a significant amount of radio interference that might otherwise interfere with the signal transmissions used for the passive controller tracking that is described herein.

In such alternative embodiments, for example, the system can dynamically detect interference, based on analyzing sensor data received at the system and/or based on user input or third-party input, and can responsively activate and/or use IMU sensor data from the IMU 124, if one is provided, to perform active tracking.

The controller may also include a separate power supply (not shown) to power any powered components in the passive tracking controller.

In some embodiments, the passive controller system 120 comprises one or more active assemblies, converting the passive controller system into an active controller system. For example, in some instances, the active retrodirective surface mount antenna assembly comprises a retrodirective antenna array coupled with an amplifier, which amplifies the reflected signal and significantly increases the effective radar cross-section provided by the controller system.

Figure 2A:
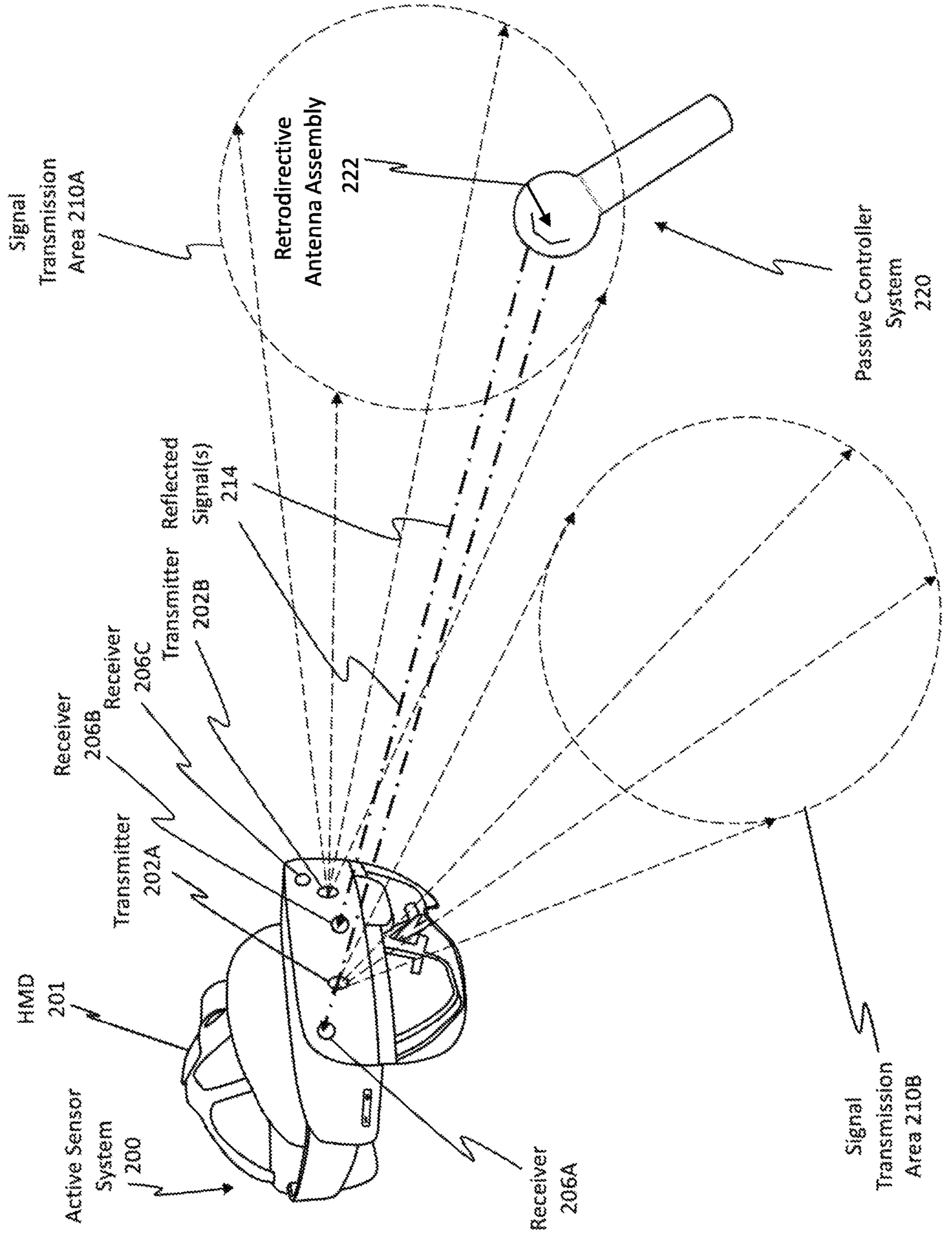
FIGS. 2A-2B illustrate an example embodiment for using the active sensor system to track the passive controller system within a signal transmission area.
Figure 2B:
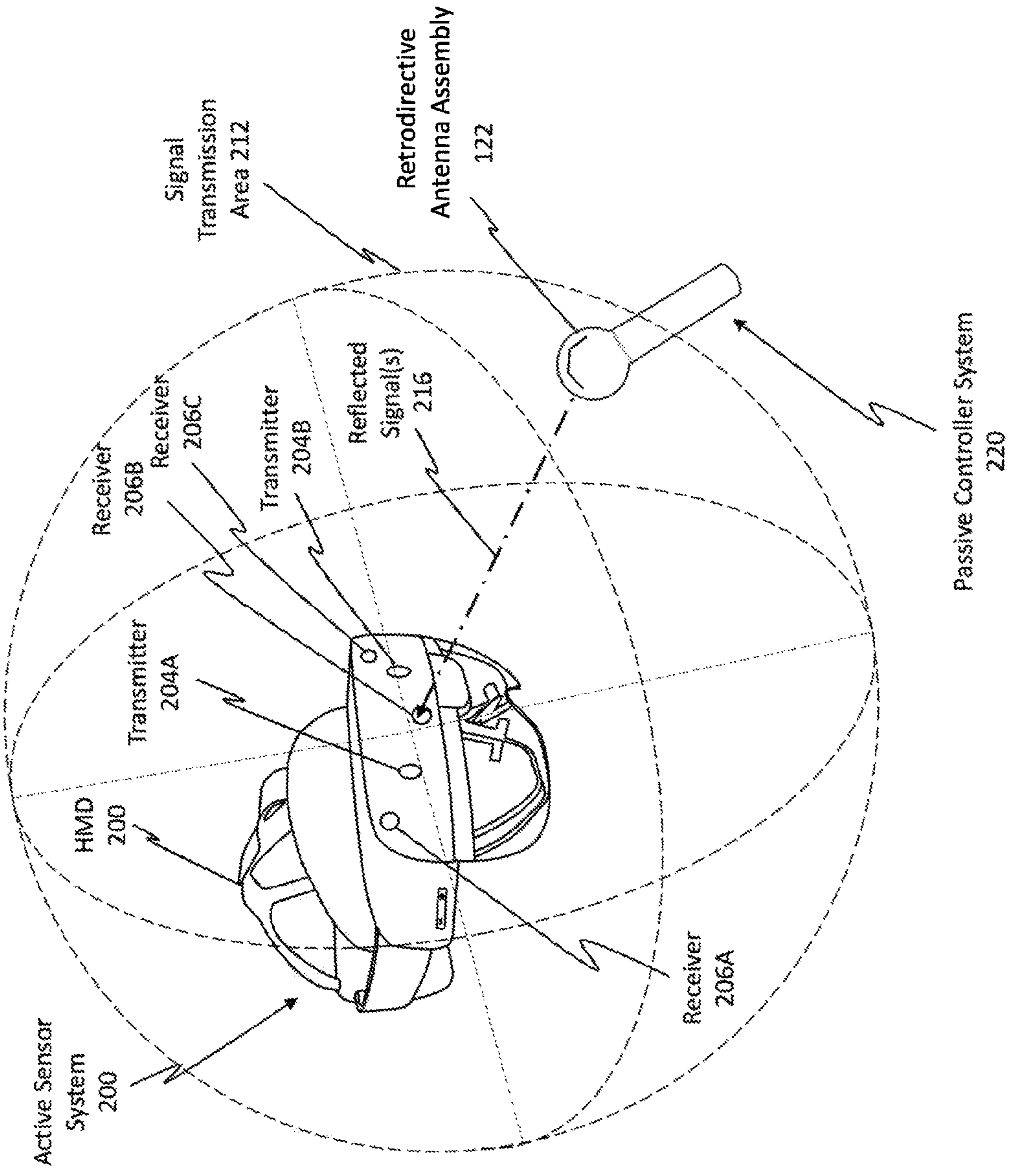

Attention will now be directed to FIGS. 2A-2B, which illustrate various example embodiments for detecting an orientation and a position of a passive controller system 220 relative to an active sensor system 200 that is positioned within a predetermined distance from the passive controller system. In these embodiments, the active sensor system 200 transmits one or more signals (e.g., within signal transmission area 210A and signal transmission area 210B) to the passive controller system 220 and in such a manner that the one or more signals are reflected from the passive controller system back to the active sensor system as one or more reflected signals 214.

The active sensor system 200 (currently depicted as HMD 201) is configured to transmit the one or more signals from a plurality of monostatic transmitters (e.g., transmitter 202A and/or transmitter 202B) of the active sensor system 200 in a relatively omnidirectional signal transmission area (e.g., signal transmission area 210A and/or signal transmission area 210B) with a directionality towards a front of the active sensor system 200, towards a passive controller system 220 that is located within a predetermined distance of the active sensor system and signal transmission area.

The active sensor system 200 is also configured to receive and detect the one or more reflected signals 214 reflected back from a retrodirective antenna assembly 222 attached to the passive controller system 220. The retrodirective antenna assembly 222 is configured on the passive controller system 220 to reflect the one or more signals back to the active sensor system 200 as the one or more reflected signals 214. In some embodiments, the signals are reflected irrespective of the orientation or position of the passive controller system when the passive controller system is positioned within the predetermined distance of the active sensor system within ta signal transmission area.

The one or more reflected signals 214/are received and detected by one or more receivers of the active sensor system 200 (e.g., receiver 206A, receiver 206B, and/or receiver 206C) The active sensor system 200 is then able to calculate/determine the orientation and the position of the passive controller system 220 relative to the active sensor system based on the one or more originating signals within signal transmission area (e.g., 210A and/or 210B) and the one or more reflected signals 214.

As shown in FIG. 2A, the one or more signals transmitted by transmitter 202A and/or transmitter 202B are transmitted within signal transmission area 210A and/or signal transmission area 210B. As shown in FIG. 2A, signal transmission area 210A and signal transmission area 210B are separate and discrete signal transmission areas. In some embodiments, signal transmission area 210A and signal transmission area 210B at least partially and/or completely overlap. In other embodiments, the signal transmission area 210A and signal transmission area 210B do not overlap.

As shown in FIG. 2B, in some embodiments, the active sensor system 200 includes a plurality of transmitters (e.g., transmitter 204A and transmitter 204B) which are configured to transmit one or more signals within a continuous signal transmission area 212 which covers at least a hemisphere of spherical range for signal transmission to the passive controller system 220, when the passive controller system 220 is located within a particular distance relative to the active sensor system 200. The assembly 222 of the passive controller system 220 is configured to reflect the one or more signals within the signal transmission area 212 as one or more reflected signals 216 back to the plurality of receivers of the active sensor system 200.

In other embodiments, the signal transmission area surrounds the active sensor system 200 by more than a single hemisphere, and in some instances, by a full spherical coverage surrounding the active sensor system 200, such as by positioning more of the transmitters around different portions of the HMD 200 and/or auxiliary devices that are in communication with the HMD 200.

Figure 3:
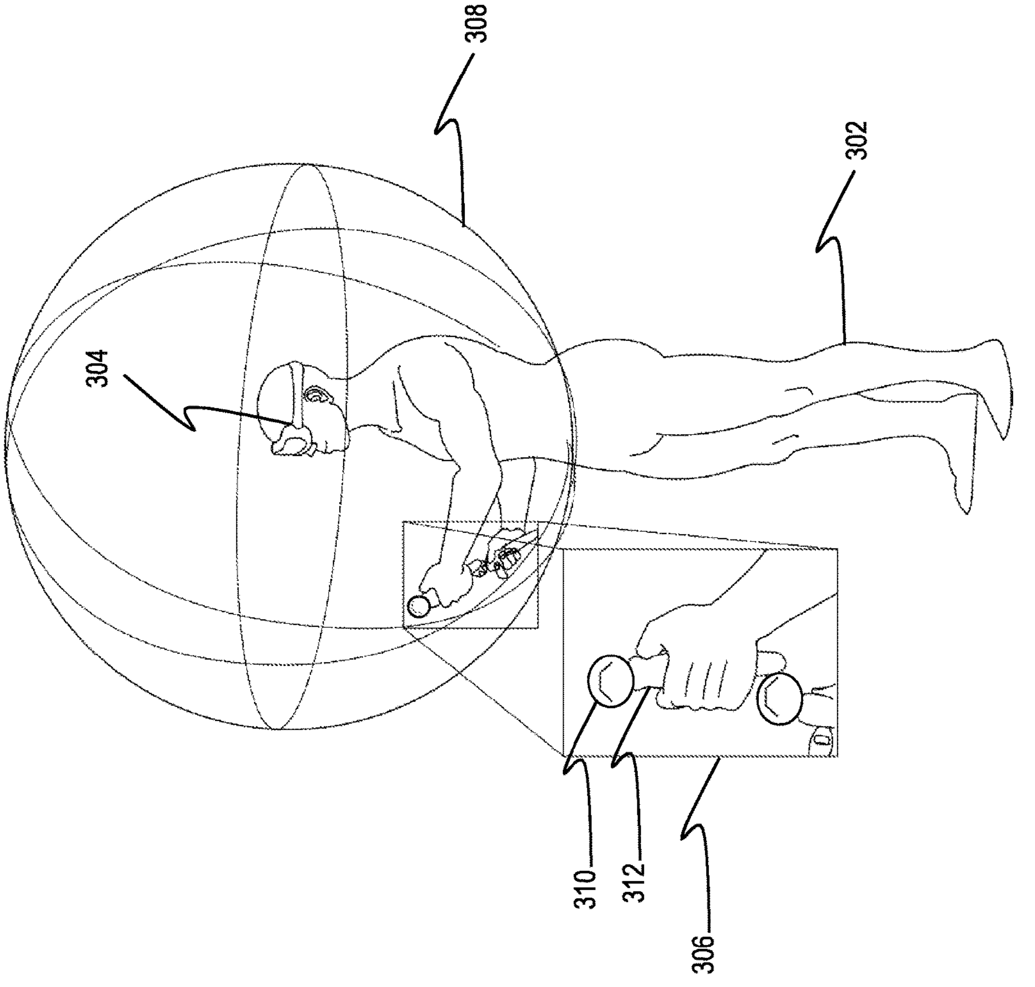
FIG. 3 illustrates an example embodiment for using an active sensor system to track a passive controller system within a predetermined distance of the active sensor system.

Attention will now be directed to FIG. 3, which illustrates an example embodiment for using an active sensor system 304 to track a passive controller system 306 within a predetermined distance 308 of the active sensor system 304.

The passive controller system 306 includes a body 312A configured to be held in a hand of a user 302 and to be moved with the hand of the user in six degrees of freedom (6DOF). In this regard, the passive controller system 306 can be viewed as a 6DOF controller.

The passive controller system 306 also includes at least one multiple retrodirective surface mount antenna assembly 310 attached to the body 312 in a configuration that provides a reflecting surface for reflecting a radar signal when the passive controller system is positioned within less than or equal to a predetermined maximum distance from a source of the radar signal. In some instances, the retrodirective surface mount antenna assembly provides at least 180 degrees of reflecting surface for reflecting a radar signal in at least 180 degrees of spherical range when the passive controller system is positioned within a predetermined distance 308 (e.g., a distance determined by the user or within a maximum range dictated by the radar cross section provided by the multiple retrodirective surface mount antenna assembly) from a source of the radar signal with an orientation that is within the at least 180 degrees of spherical range relative to the source of the radar signal. In some embodiments, the passive controller system is positioned within a predetermined distance 308 from a source of the radar signal with an orientation that is within 360 degrees of spherical range relative to the source (e.g., the active sensor system 304) of the radar signal.

In some embodiments, the predetermined distance 308 between the active sensor system 304 and the passive controller system 306 is within a range (or having a radius) of about 0.01 meters to about 4 meters. However, in some alternative embodiments, the range of the predetermined distance 308 can also extend beyond 4 meters and/or be within less than 0.01 meters.

It should be appreciated that the signals that are generated and transmitted by the active system as illustrated in FIGS. 2A-2B are tunable depending on the size of the passive controller system and/or the predetermined distance between the passive controller system and the active sensor system. For example, the signal ranges from about 60 GHz to about 100 GHz, or more broadly, between 24 GHz to about 110 GHz. In particular, 60 GHz is an appropriate radio frequency because it maintains signal power through short ranges, such as an arm's length for a user (e.g., between 0.1 to 1.1 meters). 60 GHz is also usable for longer ranges, up to approximately 4 meters.

Increasing the radio frequency (e.g., 110 GHz) allows the retrodirective assemblies to be smaller than conventional radar reflectors. These frequencies and respective retrodirective array sizes allow the active sensor system to obtain sub-millimeter and sub-radian tracking accuracy for the passive controller system.

In some instances, each retrodirective antenna array of the assembly 222 is tuned to a different frequency, in order to increase the range frequencies for which it can maintain ample signal power.

The predetermined distance of operation between the passive controller system and the active sensor system can be increased, especially if the assembly 222 is placed on the passive controller system at a length that is further away from the user's arms and hands, by adjusting the tuned frequencies of the antennas and/or the transmission frequencies of the active sensor transceiver(s).

In some instances, where the passive controller system is configured as an elongated remote control (or as an object-based remote control such as a lightsaber or sword), when the assembly is placed toward a distal end of the elongated remote control away from the user's hand, there is decreased interference/interruption within the line-of-sight for the signal reflection, as well as less likelihood of the user touching or shorting out portions of the retrodirective assembly.

Figure 4:
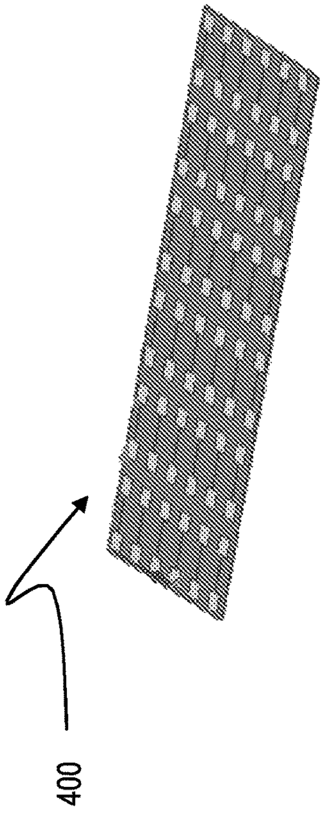
Figure 4 (Prior Art)
FIG. 4 illustrates a conventional retrodirective antenna array.
Figure 5:
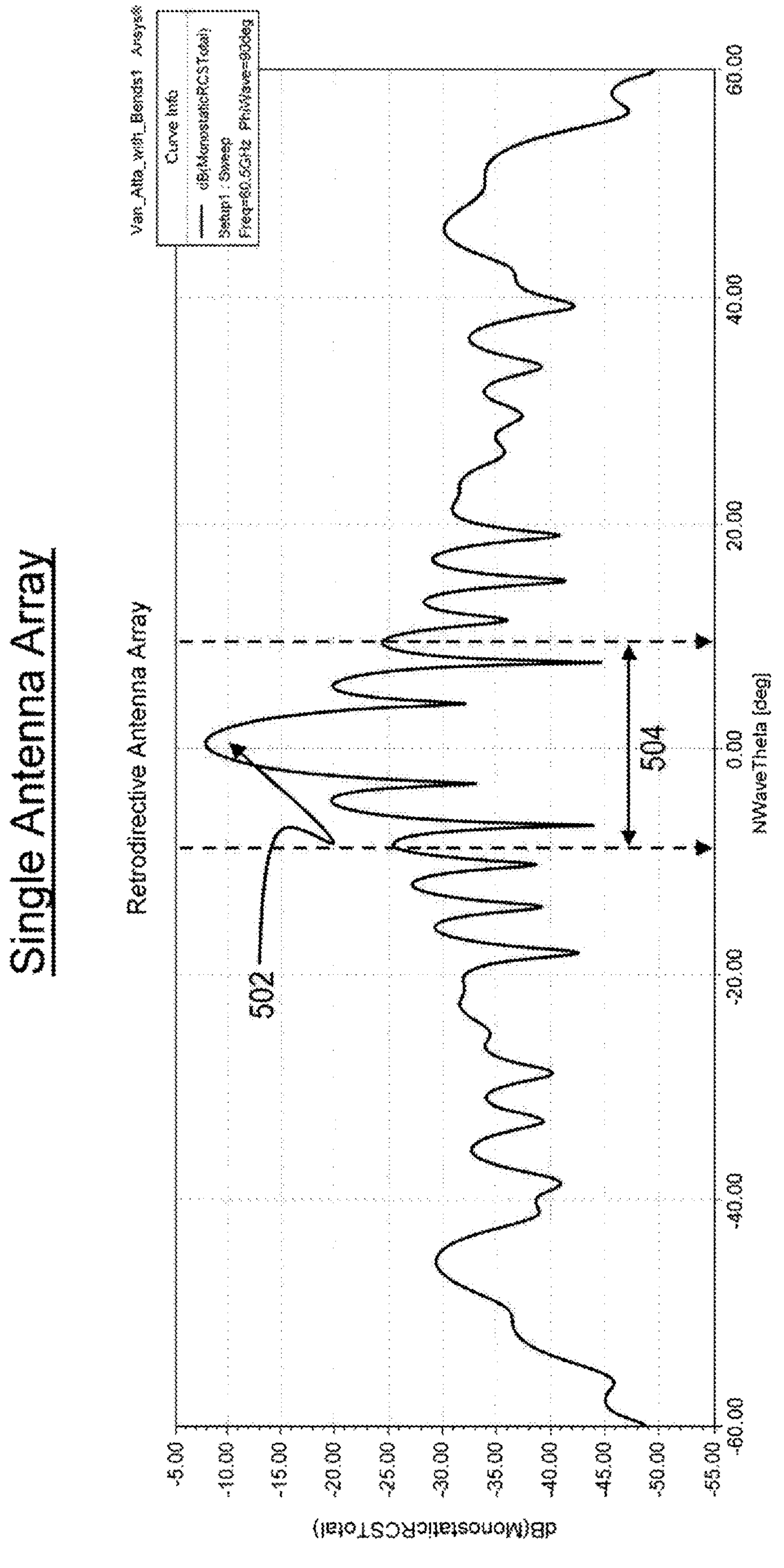
FIG. 5 Illustrates an example graph showing a signal response of the conventional retrodirective antenna array.

Attention will now be directed to FIG. 4, which illustrates a conventional antenna array (e.g., antenna array 400). As shown in FIG. 4, antenna array 400 comprises a planar, rectangular shape. Antenna array 400 also comprises a plurality of antenna unit cells that are tuned for a particular frequency. Conventional antenna arrays like antenna array 400 have poor reflectance when incident electromagnetic waves are at an angle from the antenna surface normal. Additionally, the radar cross-section is limited to what is provided by the single plane. This can be seen in FIG. 5, which illustrates an example graph showing a signal response of the conventional retrodirective antenna array. For example, as shown in FIG. 5, there is only one amplitude peak 502, and its bandwidth 504 is narrow, even when considering adjacent amplitudes, which have much lower values than the amplitude peak.

Figure 6A:
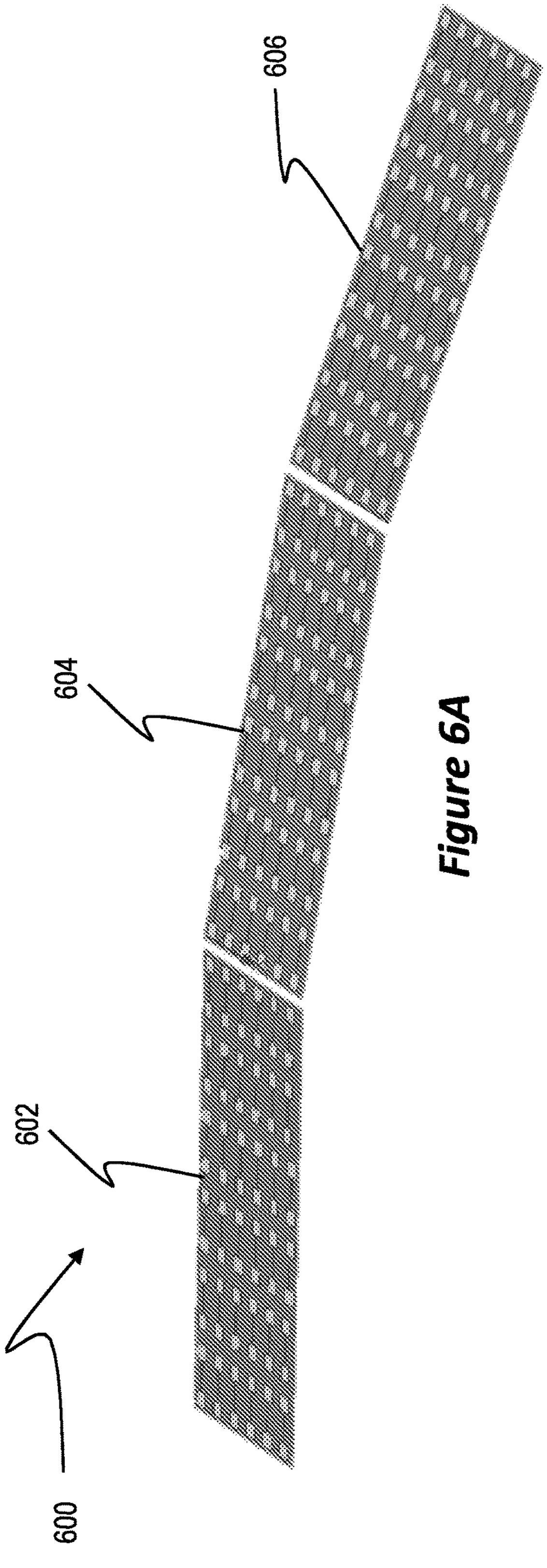
FIGS. 6A-6B illustrate an example embodiment of a novel retrodirective antenna assembly.
Figure 6B:
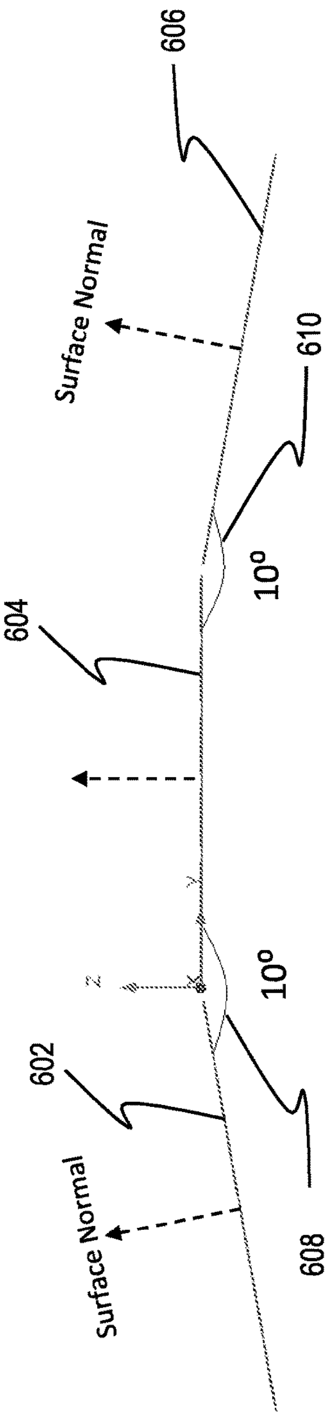

Attention will now be directed to FIGS. 6A-6B, which illustrate an example embodiment of a novel retrodirective antenna assembly. For example, FIG. 6A shows a perspective view of a multiple retrodirective surface mount antenna assembly 600 which comprises a plurality of retrodirective antenna arrays (e.g., array 602, array 604, array 606). Each retrodirective antenna array is mountable on a surface such that each retrodirective antenna array is offset at an angle from at least one other retrodirective antenna array. The assembly 600 is configured to reflect a radar signal received from a radar signal source to a radar signal receiver.

As described throughout, many different configurations of the assembly can be implemented. For example, in some instances, at least one distal edge of each retrodirective antenna array is flush with an edge of another retrodirective antenna array, while in other instances, at least one array is spatially separated from one or more other adjacent arrays in the assembly.

As shown in FIG. 6A, each retrodirective antenna array comprises a rectangular shape having two elongated edges and two distal edges. The plurality of retrodirective antenna arrays is aligned linearly with the distal edges of each retrodirective antenna array being adjacent. In some instances, arrays are aligned such that the elongated edges of each array are adjacent.

As shown in FIG. 6B, the plurality of retrodirective antenna arrays comprises a first retrodirective antenna array (array 602) comprising a first distal edge and a second distal edge, a second retrodirective antenna array (array 604) attached to the first distal edge of the first retrodirective antenna array at a first angle 608 offset in the horizontal direction, and a third retrodirective antenna array (array 606) attached to the second distal edge of the first retrodirective antenna array at a second angle 610 offset in the horizontal direction. In some instances, as shown in FIG. 6B, the first angle 608 and second angle 610 comprise equal angles (e.g., 10 degrees). Alternatively, in some instances, the first angle 608 and the second angle comprise different angles of offset, such as an angle of between 5-10 degrees or another angle of less than 10 degrees (e.g., an angle of between 1-5 degrees), 10-20 degrees or another angle of more than 10 degrees (e.g., an angle of 20-90 degrees).

Each retrodirective antenna array of the assembly 600 is tunable to one or more frequencies. Thus, in some instances, each array is tuned to the same frequency, while in other instances, at least one retrodirective antenna array is tuned to a different frequency than another retrodirective antenna array.

Figure 7:
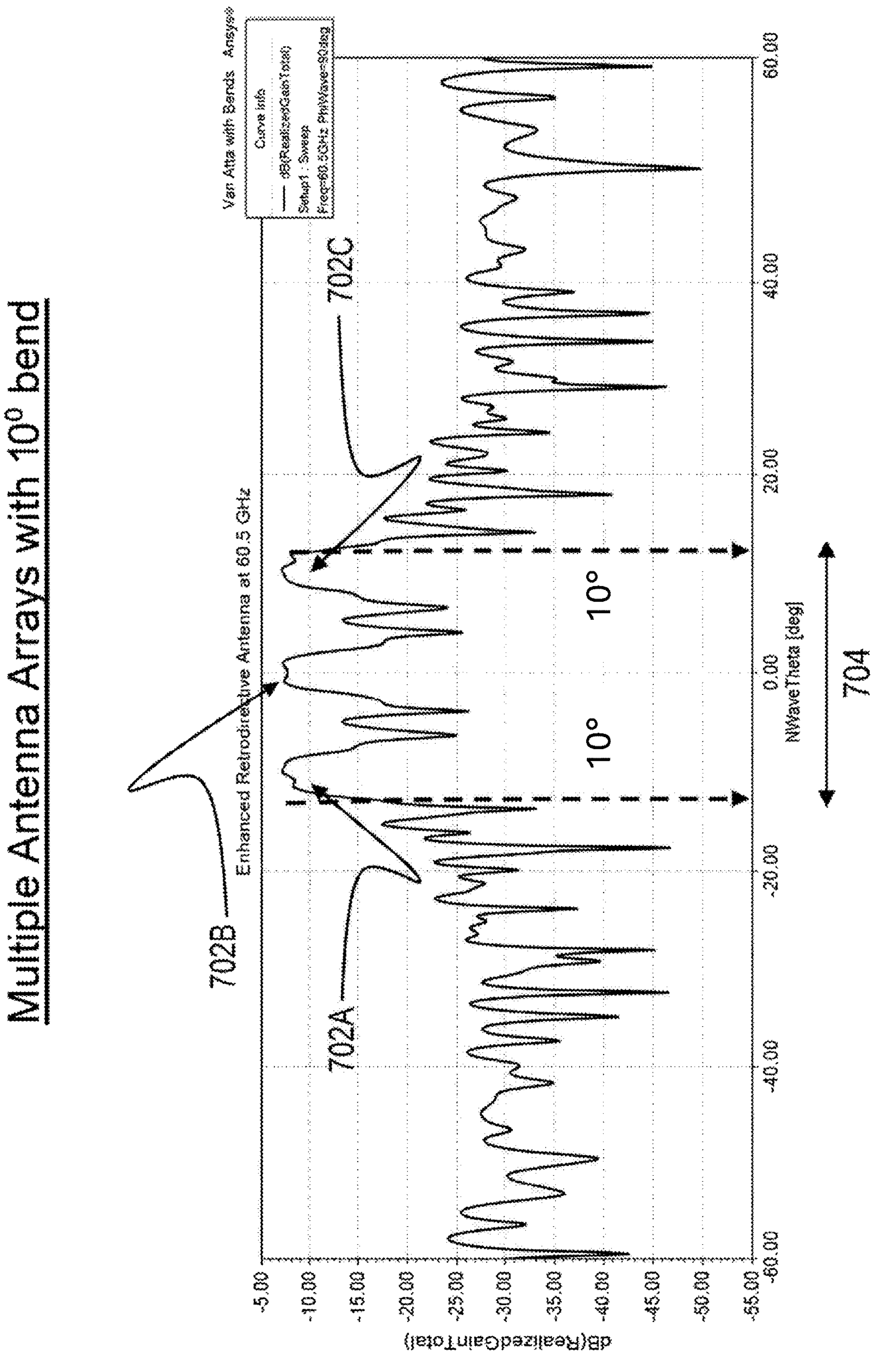
FIG. 7 illustrates an example graph showing a signal response of the novel retrodirective antenna assembly.

Obtaining good radar frequency reflection at various angles of incident is beneficial for improved radar detection. Thus, as shown in FIGS. 6A-6B, by having more than one retrodirective antenna array and having an angle between their respective surface normal, the overall reflection power is increased at the incident angle. This, in turn, improves the radar cross-section provided by the assembly. This improved reflection power can be seen in FIG. 7, which illustrates an example graph showing a signal response of the novel retrodirective antenna assembly. For example, as shown in FIG. 7, there are now multiple adjacent high amplitude peaks (e.g., amplitude peak 702A, amplitude peak 702B, amplitude peak 702C). This significantly increases the bandwidth 704, as compared to the bandwidth 504 of FIG. 5. This improvement is achieved by having multiple retrodirective antenna arrays offset at an angle from each other.

It should be appreciated that the assembly 600 is configured to be used as part of a controller system, wherein the assembly 600 is mounted on a surface of a controller body that can be held and/or otherwise maneuvered by a user. Additionally, to further improve the radar cross-section, and as described in more detail in FIG. 14, some disclosed embodiments are also provided in which a reflection amplifier is electrically coupled with the retrodirective antenna array such that a reflected power associated with a reflected radar signal is greater than incidental power corresponding to an incidental radar signal.

Figure 8:
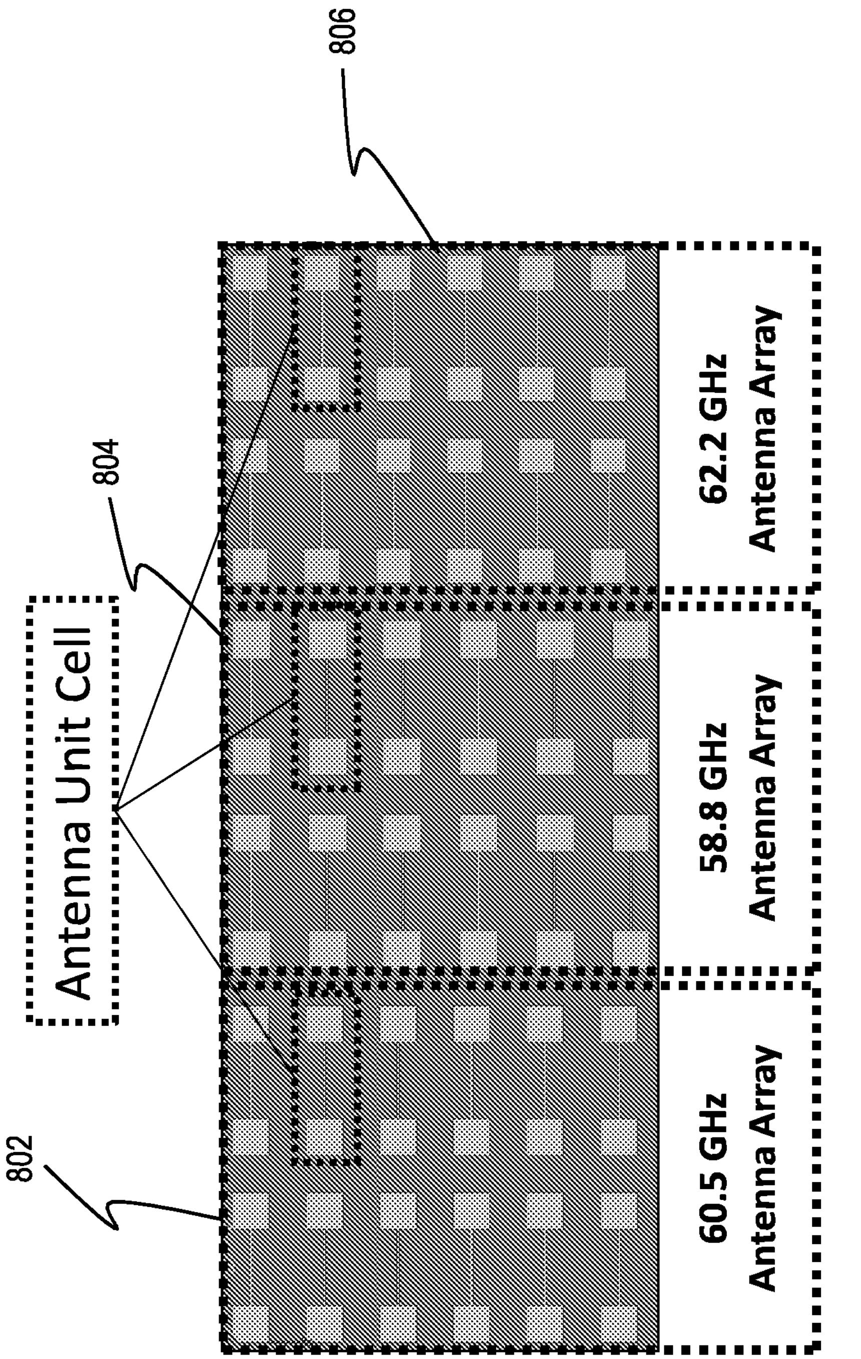
FIG. 8 illustrates an example configuration and frequency tuning of the novel retrodirective antenna assembly.

Attention will now be directed to FIG. 8, which illustrates an example configuration and frequency tuning of the novel retrodirective antenna assembly. For example, a first antenna array 802 is tuned to 60.5 GHz, a second antenna array 804 is tuned to 58.8 GHz, and a third antenna array 806 is tuned to 62.2 GHz. Each antenna array comprises a plurality of antenna unit cells. These unit cells can be customized according to different sizes and, therefore, different frequencies.

The overall size dimensions of the antenna array assembly and each antenna array in the assembly can vary to accommodate different needs and preferences and may be dictated by the quantity of antenna unit cells on each array. In some instances, as shown, each antenna array in the antenna array assembly may have a similar width and length. In other embodiments, not shown, the antenna array assembly includes different antenna arrays with different corresponding widths and/or lengths, such as to accommodate different quantities of antenna unit cells on the different corresponding antenna arrays.

By configuring retrodirective antenna assemblies with different antenna arrays that are each tuned to a different frequency, the overall response of the assembly can be made broadband. Broadband refers to the wide-bandwidth data transmission that is configured to transmit multiple signals at a wide range of frequencies. This beneficially increases transmission speed. This is beneficial for object tracking, particularly in VR and augmented reality situations which will require fast transmission speeds to improve the rendering of the object within the virtual environment. Faster rendering improves the user experience by preventing delays in the visual feedback of the environment within the virtual display for the user.

Figure 9A:
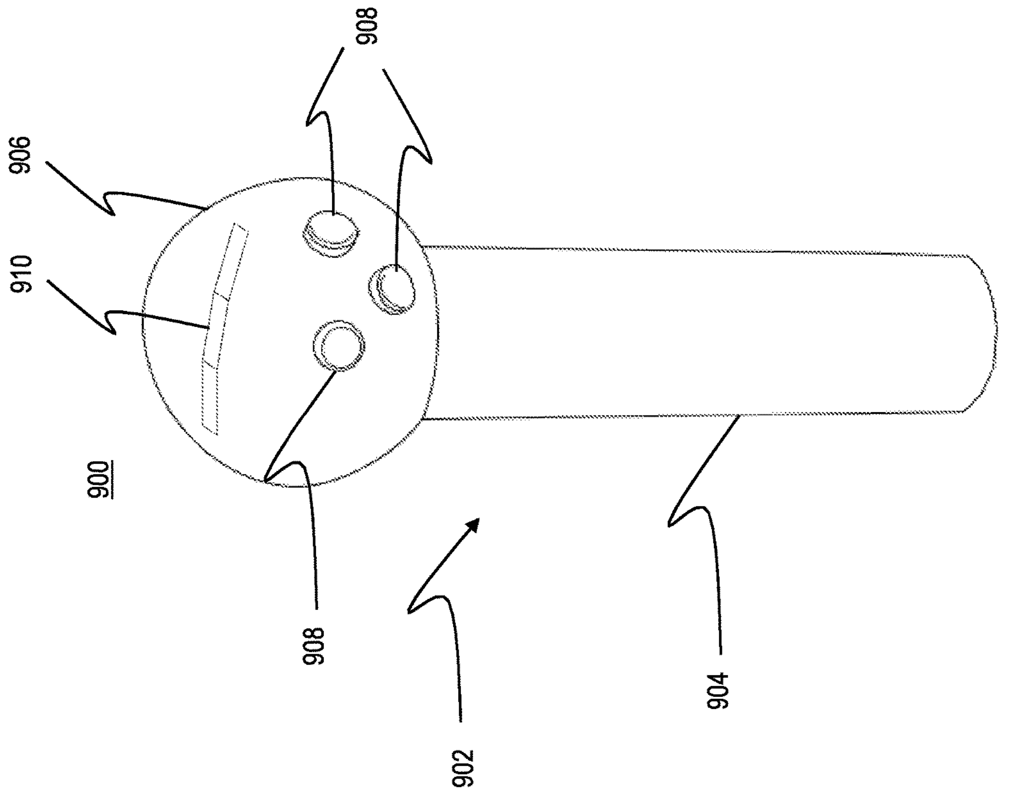
FIGS. 9A-9C illustrate front views of various example embodiments of a passive controller system.
Figure 9B:
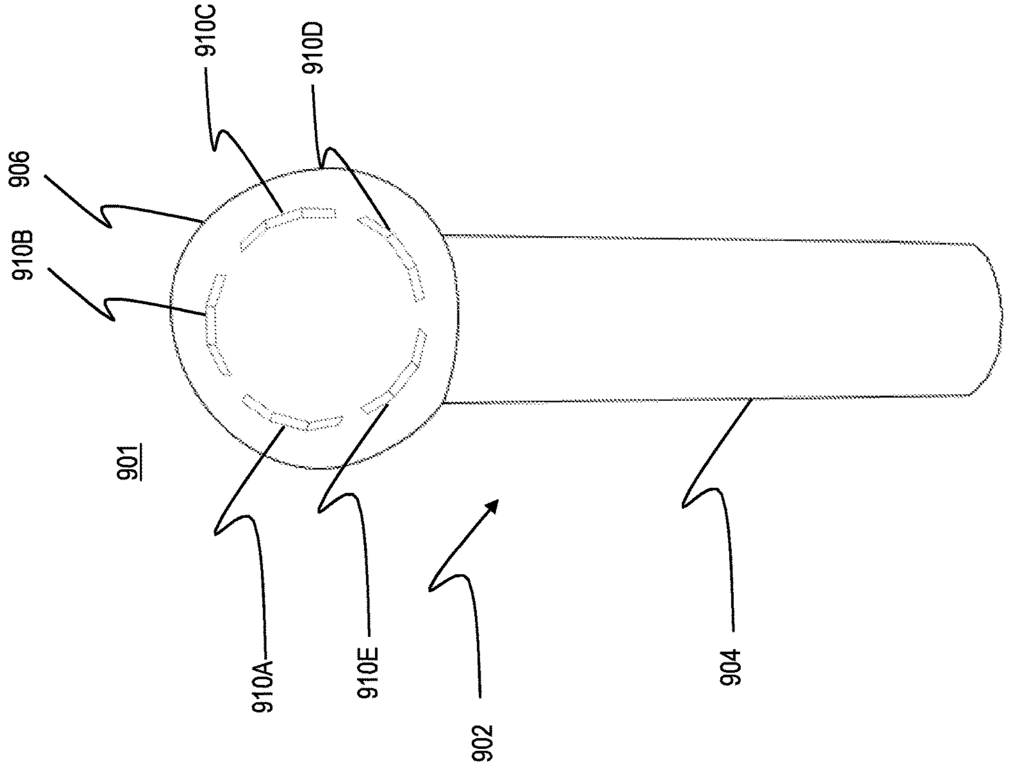
Figure 9C:
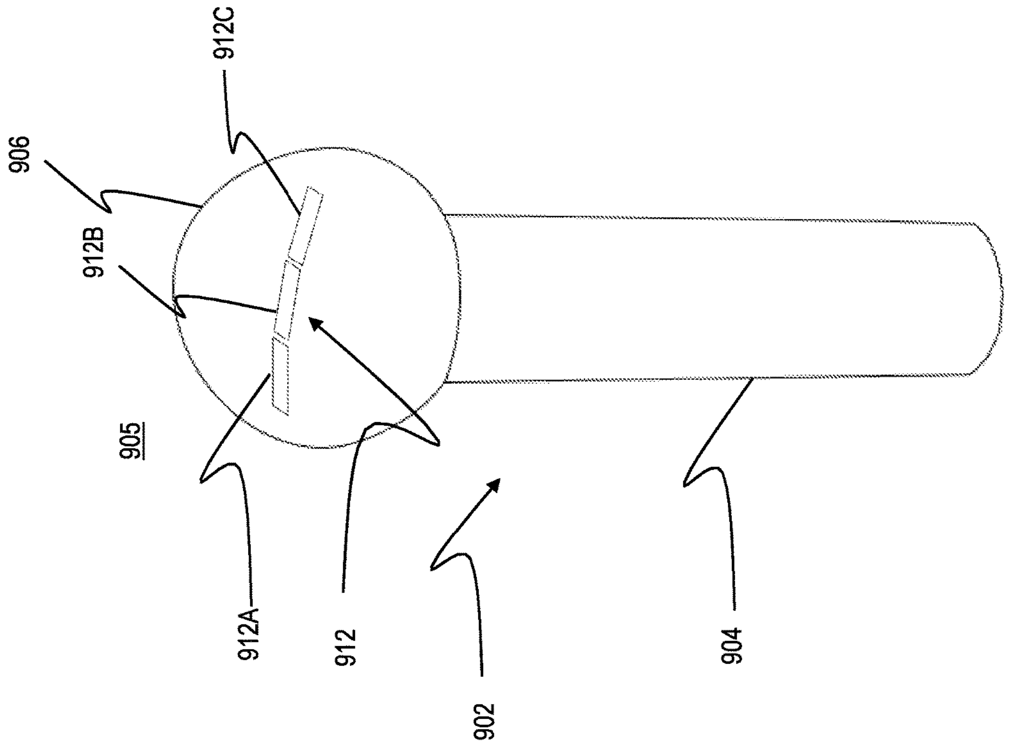

Attention will now be directed to FIGS. 9A-9C, which illustrate various front views of some example embodiments of a passive controller system. As shown in FIG. 9A, the passive controller system 900 includes a controller body 902 comprising a handle base 904 and a top portion 906, wherein user input controls 908 are disposed on the controller body 902 on and/or near the top portion 906. In such embodiments, the passive controller system 900 includes a retrodirective assembly 910 that is mounted on an outer surface of the body (or housing of the body).

The retrodirective assembly is capable of reflecting signals received at the controller. In some instances, when the retrodirective assembly 910 is mounted on an inside surface of the controller body (such that the incoming and reflecting signals are enabled to pass through the relatively non-reflective housing of the body), the retrodirective assembly 910 is capable of reflecting signals received through the controller. To enable such a configuration, the controller body is composed of a relatively non-reflective material, such as a non-metallic material like plastic.

Attention will now be directed to FIG. 9B, which illustrates a front view of an example embodiment of a passive controller system 901 with a plurality of retrodirective assemblies (e.g., retrodirective assembly 910A, retrodirective assembly 910B, retrodirective assembly 910C, retrodirective assembly 910D, and retrodirective assembly 910E) mounted on a controller body 902 of the passive controller system (e.g., passive controller system 900 of FIG. 9A). It should be appreciated that while five retrodirective assemblies are shown being mounted on the controller body 902, any number of retrodirective assemblies are mountable to the controller body, for example, a maximum number of retrodirective assemblies being the number of assemblies that will fit on the available surface area of the controller body.

As shown in this configuration, the passive controller system 901 includes a plurality of retrodirective assemblies, where each retrodirective assembly is configured as a single discrete and integrally connected retrodirective assembly (i.e., the retrodirective antenna arrays in each assembly are connected) that provides more than 90 degrees of signal reflection, (in some instances, at least 180 degrees of signal reflection surface area, 270 degrees of signal reflection surface area and/or 360 degrees of signal reflection surface area).

As shown, in FIG. 9B each retrodirective assembly is physically separated from each other by at least a small space, and such that the multiple retrodirective assemblies are not integrally connected into a larger integrated assembly. This space may be a few millimeters (e.g., 3-4 mm), or less (e.g., 1-2 mm), or more than a few millimeters (e.g. 5 mm, 6 mm, 7 mm, 7+ mm).

In other instances, the one or more retrodirective assemblies are in direct contact with another retrodirective assembly of the plurality of retrodirective assemblies. As shown in FIG. 9B, the plurality of retrodirective assemblies is positioned and distributed throughout the top portion 906 of the controller body 902. Additionally, or alternatively, the plurality of retrodirective assemblies is distributed handle base 904 to provide a desired coverage of signal reflection surface area based on their collective orientations and positioning within the base.

In some embodiments, the individual retrodirective antenna arrays and/or retrodirective assemblies are redundant (in frequency, surface area, and/or angle of reflection) relative to other retrodirective antenna arrays and/or retrodirective assemblies incorporated within and/or on the controller to provide overlapping and redundant signal reflection surface areas relative to one or more other retrodirective assemblies of the controller. Such a configuration is beneficial to compensate for and mitigate situations where one or more signals are interfered with or blocked during the use of the controller, based on objects being temporarily interposed between the passive controller and the active sensor system (e.g., a metal watch of a user).

As shown in FIG. 9B, the passive controller system 900 omits any active sensor device and is capable of reflecting the radar signal with the plurality of retrodirective assemblies to a receiver that translates reflected signals from the plurality of retrodirective assemblies to determine a relative position and an orientation of the passive controller system relative to the receiver.

As mentioned earlier, the passive controller system omits any inertial measurement unit (IMU) in some instances. In other alternative embodiments, the passive controller system may optionally include an IMU, wherein the IMU is configured to selectively replace and/or supplement the tracking capability of the active sensor system and provide supporting orientation and position data to the active sensor in order to more accurately and precisely determine the orientation and position of the passive controller system relative to the active sensor system during certain detected conditions, e.g., based on user input, based on bad signal reception at the receivers, based on application requirements, etc.

Beneficially, in most embodiments, the controller is a completely passive tracking controller and such that all of the tracking components (i.e., the retrodirective antenna arrays) utilized by the controller are unpowered components and do not require any specialized circuitry (even passive circuitry like passive RFID circuit), nor do they require specialized and powered printed circuit board (PCB) components or other processor chips within the controller itself.

Beneficially, because the retrodirective assemblies are passive, the passive controller system 901 does not need to be synchronized and/or remain in network communication with the active sensor system for the tracking processes of the passive controller within a predetermined distance of the active sensor system. Additionally, due to the nature of the signals being used for the tracking, the passive controller does not have to remain within line-of-sight of the active sensor system, as required for image tracking.

As described herein, the plurality of retrodirective assemblies are attached to and/or within the body of the passive controller are positioned on/in the body/housing of the passive controller to provide 360 degrees of reflecting surface and/or up to 360 degrees of reflecting surface (e.g., <90 degrees of reflecting surface, >90 degrees of reflecting surface, >120 degrees of reflecting surface, >180 degrees of reflecting surface, >270 degrees of reflecting surface, and/or <360 degrees of reflecting surface).

The referenced angular range(s) of the reflecting surface facilitate the reflection of the referenced radar signals that are transmitted from a signal source system (e.g., active sensor system and/or a related system) towards the retrodirective assemblies and that are reflected back to a receiver (e.g., the active sensor system and/or related system), irrespective of the orientation of the body/housing relative to the source of the radar signal within the predetermined distance.

Attention will now be directed to FIG. 9C, which illustrates another example embodiment of a passive controller system 905. As shown in FIG. 9C, each individual retrodirective antenna arrays (e.g., array 912A, array 912B, and array 912C) of the retrodirective assembly is not in any direct contact with another retrodirective assembly in the controller. In this configuration, some or all of the individual arrays can be mounted to a surface of the controller body 902 such that they are not touching but are adjacent to each other and angularly offset in at least one direction (e.g., x direction, y direction, z direction, or a combination thereof). For example, each retrodirective array is tunable to provide a different angle of reflection with respect to one or more other retrodirective arrays.

This spacing between different antenna arrays may be a few millimeters (e.g., 3-4 mm), or less (e.g., 1-2 mm), or more than a few millimeters (e.g. 5 mm, 6 mm, 7 mm, 7+ mm).

In other configurations, each of the antenna arrays is in direct contact with at least one other antenna array in the antenna array assembly.

Notwithstanding the specific embodiments just described, it will be appreciated that the scope of the invention includes passive controllers that are configured with any combination and quantity of the retrodirective arrays and assemblies, and which may be exposed and visible, externally mounted to the controller body 902 and visibly on the external housing/body of the controller, (e.g., mounted on an outer surface of the controller body 902) and/or that are encapsulated within the controller body and/or that are not visible when viewing the controller body 902 (e.g., mounted on an inner surface of the controller body).

Additionally, or alternatively, in some instances, a controller system comprises at least one retrodirective assembly which is an integral unit (e.g., retrodirective assembly 910), and at least one retrodirective assembly (e.g., retrodirective assembly 912) where at least one retrodirective array (e.g., array 912A) is not in direct contact with another retrodirective array.

Some embodiments are also provided in which each retrodirective antenna array of a particular retrodirective assembly is mounted at a different offset angle from an adjacent retrodirective antenna array. Additionally, or alternatively, some embodiments are provided in which at least one retrodirective assembly of a plurality of retrodirective assemblies comprises a different offset angle than another retrodirective assembly. By way of example, a first retrodirective assembly may comprise retrodirective antenna arrays which are offset at 10 degrees from adjacent arrays and a second retrodirective assembly may comprise retrodirective antenna arrays which are offset at 15 degrees from adjacent arrays. Additionally, in other embodiments, the different pairings of adjacent arrays in any single assembly may be configured with different corresponding offset angles.

As shown in FIGS. 9A-9C, some disclosed embodiments are beneficially directed to passive controller systems which comprise (i) a body (e.g., controller body 902) configured to be held in a hand of a user and to be moved with the hand of the user in six degrees of freedom and (ii) a multiple retrodirective surface mount antenna assembly comprising a plurality of retrodirective antenna arrays, wherein each retrodirective antenna array is mounted on a surface of the body such that each retrodirective antenna array is offset at an angle from at least one other retrodirective antenna array. Notably, the angle of offset, angular offset, or offset angle, between a first pairing of two adjacent antenna arrays in the antenna array assembly may be the same as or different than a second angle of offset, angular offset, or offset angle existing between a second pairing of adjacent antennas in the same antenna array assembly.

In some instances, the plurality of retrodirective antenna arrays is mounted on the body or housing of the controller in a configuration that provides at least 180 degrees of reflecting surface. Additionally, some systems comprise one or more additional passive multiple retrodirective surface mount antenna assemblies, which increase the amount and range of the reflecting surface provided by the passive controller system. It should also be appreciated that while FIGS. 9A-9C illustrate assemblies where each retrodirective antenna array comprises a substantially similar surface area and dimensional size, some disclosed embodiments are also directed to assemblies that comprise arrays of different shapes, surface areas, and/or sizes.

Figure 10:
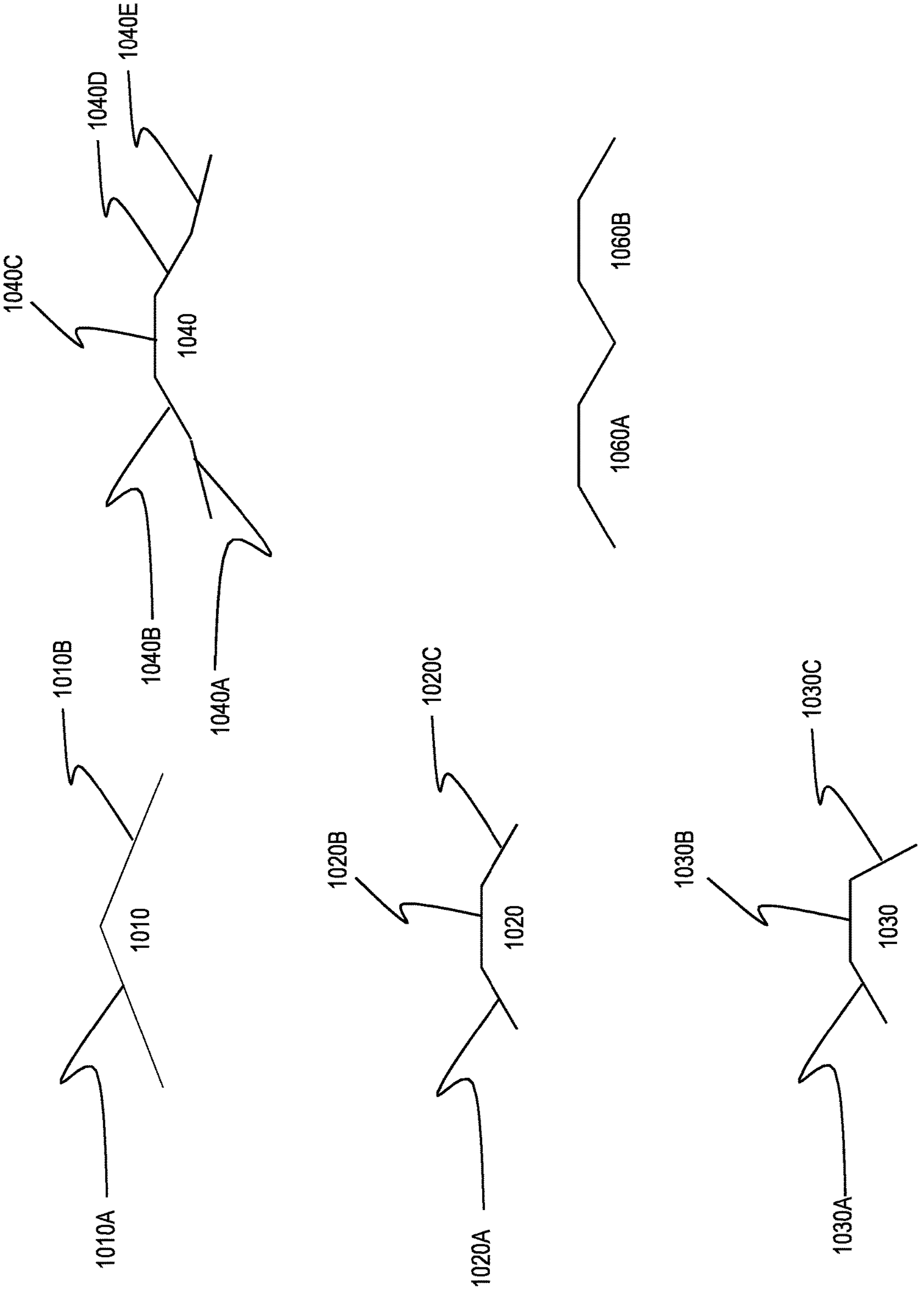
FIG. 10 illustrates various example embodiments of a novel retrodirective antenna array.

Attention will now be directed to FIG. 10, which illustrates different example embodiments of a retrodirective assembly (e.g., assembly 1010, assembly 1020, assembly 1030, assembly 1040, assembly 1050, assembly 1060, etc.) which is mountable to a surface (either planar or spherical). As shown in FIG. 10, assembly 1010 comprises two retrodirective antenna arrays (e.g., array 1010A, array 1010B) which are offset at a particular angle.

In some instances, assemblies comprise a symmetrical shape, while in other instances, assemblies comprise an asymmetrical shape. For example, assembly 1020, which is symmetrical, comprises three retrodirective antenna arrays (e.g., array 1020A, array 1020B, array 1020C) where array 1020A is offset from array 1020B at the same angle that array 1020C is offset from array 1020B.

Assembly 1030, which is asymmetrical, comprises three retrodirective antenna arrays (e.g., array 1030A, array 1030B, array 1030C) where array 1030A is offset from array 1030B at a first angle and array 1030C is offset at a second angle from array 1030B. As another example, assembly 1040 comprises five retrodirective antenna arrays (e.g., array 1040A, array 1040B, array 1040C, array 1040D). Array 1040A is offset from its adjacent array (array 1040B) at a first angle, array 1040B is offset from a middle array (array 1040C) at a second angle, array 1040D is offset from array 1040C at the second angle, and array 1040E is offset from its adjacent array (array 1040D) at the first angle.

Additionally, or alternatively, some assemblies comprise multiple retrodirective assemblies configured in a series. For example, assembly 1060 comprises a first assembly (assembly 1060A) that is similar to assembly 1030 and a second assembly (assembly 1060B), also similar to assembly 1030. In some instances, the assemblies in series are duplicates of each other. In some instances, the assemblies in series are different.

Figure 11B:
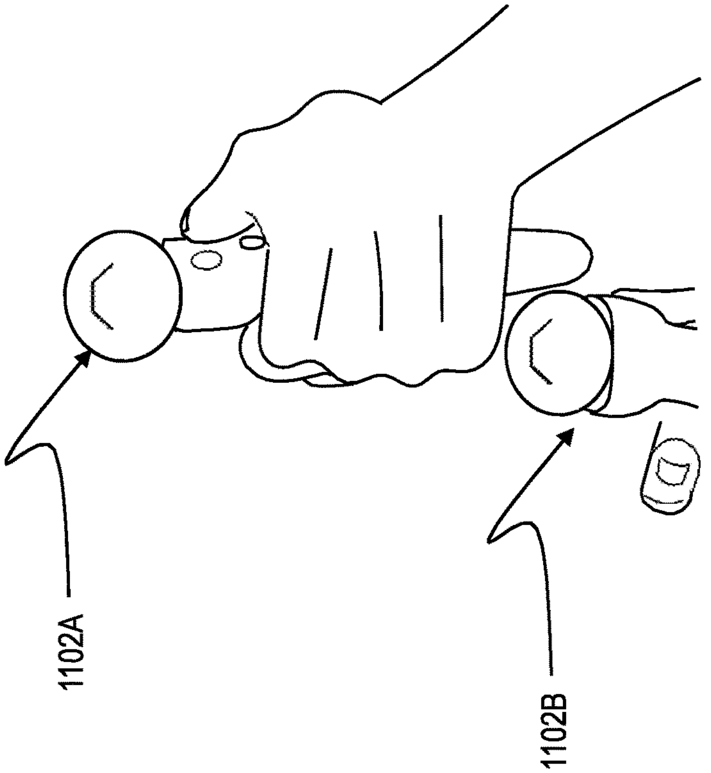
FIGS. 11A-11B illustrate an example embodiment of a multi-controller passive controller system that is trackable with respect to the active sensor system.
Figure 11A:
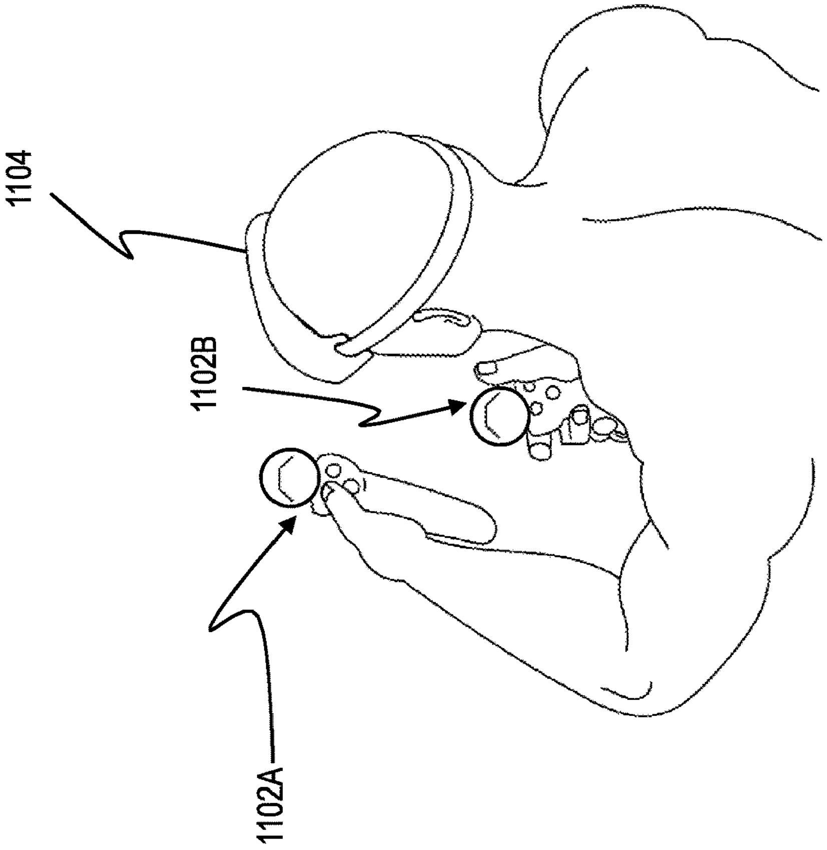

Attention will now be directed to FIGS. 11A-11B, which illustrate various views of an example embodiment of a multi-controller passive controller system that is trackable (with or without line-of-sight) with respect to the active sensor system. As shown in FIG. 11A, a passive controller system comprises a first remote control 1102A (i.e., left-hand controller) configured with a first retrodirective assembly and a second remote control 1102B (i.e., right-hand controller) configured with a second retrodirective assembly. The first remote control 1102A and second remote control 1102B are both within the line of sight of the active sensor system 1104 (depicted as an HMD).

As shown in FIG. 11B, the second remote control 1102B is partially hidden behind the first remote control 1102A, such that its line of sight with respect to the active sensor system 1104 is interrupted by the first remote control 1102A. However, because the signals that are transmitted from the active sensor system 1104 are able to pass through physical objects that are less reflective than the retrodirective assemblies of the passive control system, the active sensor system 1104 is still able to detect signals reflected from the second remote control 1102B in order to determine the orientation and position of both the first remote control 1102A and the second remote control 1102B.

Figure 12A:
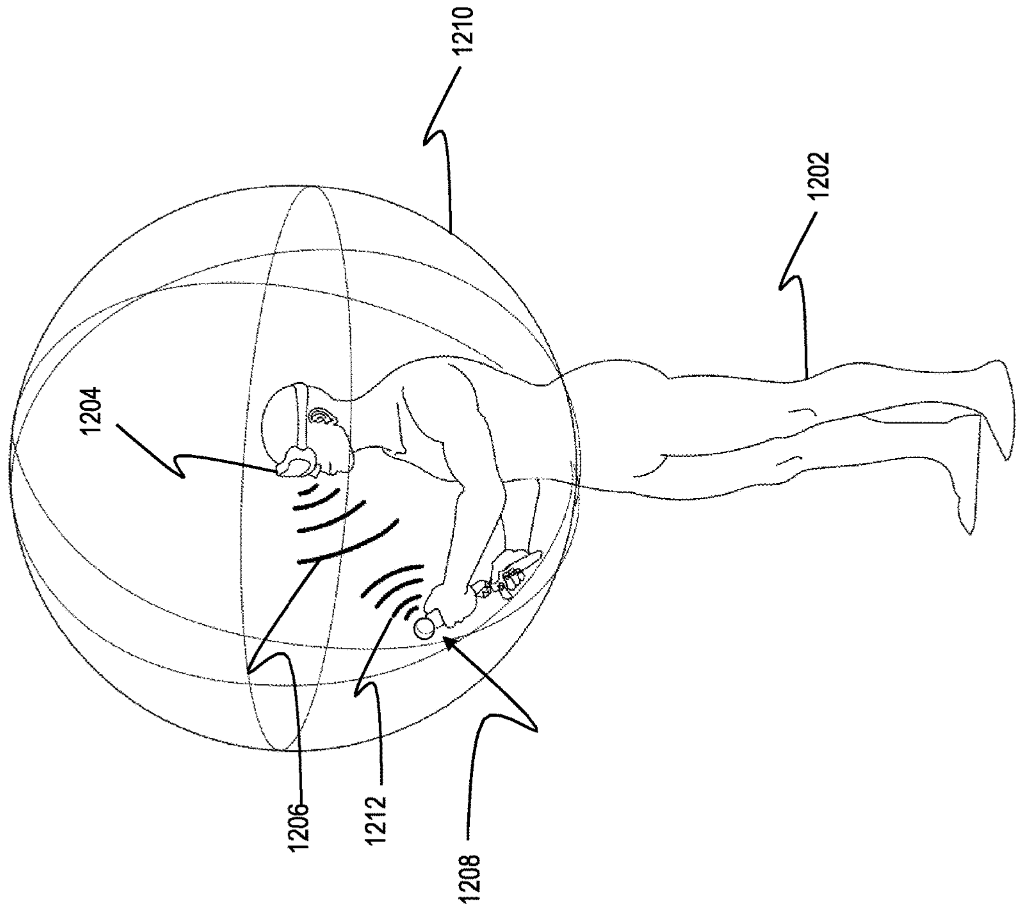
FIG. 12A illustrates an example embodiment of a signal being generated from an active sensor system configured as a head-mounted device and being reflected to the active sensor system by a passive controller system.

Attention will now be directed to FIG. 12A, which illustrates an example embodiment of a signal being generated from an active sensor system configured as a head-mounted device and being reflected back to the active sensor system by a passive controller system. FIG. 12A shows a user 1202 wearing an active sensor system 1204 configured as an HMD. The active sensor system 1204 is configured with one or more transceivers to transmit one or more signals 1206 that are reflect-able back to the active sensor system 1204 (see reflected signal 1212) by a passive controller system 1208 having a retrodirective assembly mounted thereon and being maneuvered by the user 1202 within a predetermined range 1210 relative to the active sensor system 1204.

In some embodiments, the predetermined range 1210 is a sphere, or part of a sphere (e.g., a hemisphere) having a predetermined radius. When there are physical limitations to a user's environment, the predetermined range is automatically truncated to prevent the user from trying to move the passive controller system 1208 into the unavailable spaces. The active sensor system is able to detect the different large objects in the user's environment (e.g., a wall, another person, a desk, etc.) and track the passive controller system within the user's environment that is truncated based on the detected objects.

The predetermined range 1210 is customizable based on the size and surface area of the passive controller system. For example, a larger signal reflection surface area on the retrodirective assembly will allow for a larger predetermined range. Where the passive controller system 1208 is held by a user, typically the range of motion is limited to the length of the user's arms and the flexibility of the various arm joints. Thus, the passive controller system 1208 is beneficially tuned to be optimized, lightweight, and inexpensive based on the motion range of a typical user (e.g., see FIG. 3).

Figure 12B:
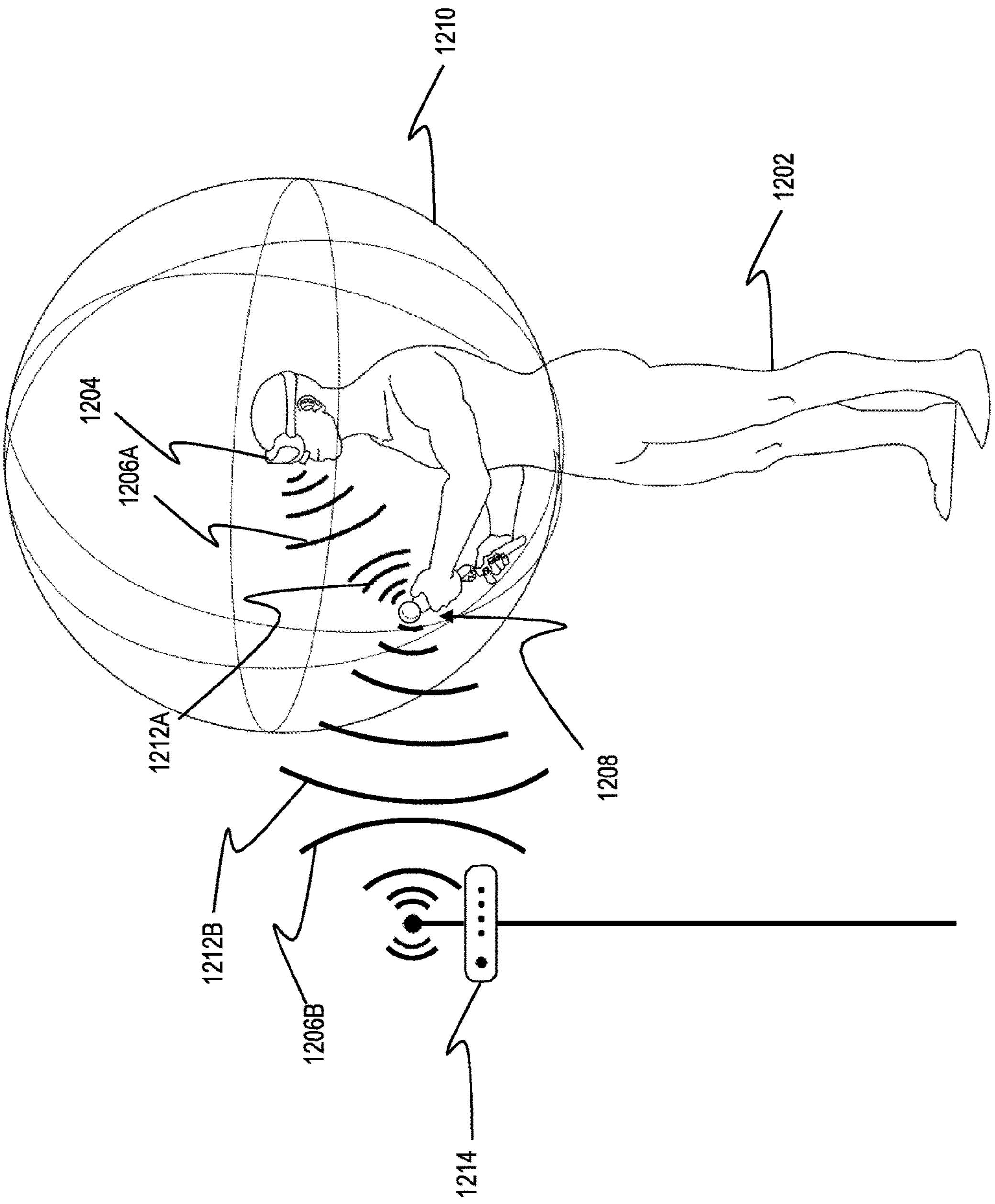
FIG. 12B illustrates an example embodiment of a signal being generated from an active sensor system configured as a beacon and being reflected to the active sensor system by a passive controller system.

Attention will now be directed to FIG. 12B, which illustrates an example embodiment of a signal being generated from an active sensor system configured as a beacon and being reflected back to the active sensor system by a passive controller system. FIG. 12B shows a user 1202 wearing an active sensor system 1204 configured as an HMD. The active sensor system 1204 is configured to transmit one or more signals 1206A that are reflect-able back to the active sensor system 1204 (see reflected signal 1212A) by a passive controller system 1208 being maneuvered by the user 1202 within a predetermined range 1210 relative to the active sensor system 1204.

Additionally, or alternatively, the active sensor system 1204 comprises a beacon 1214 that is configured to transmit one or more signals 1206B which are reflect-able back to the beacon 1214 by the passive controller system 1208 (see reflected signal(s) 1212B). The beacon is configurable as a stand-alone active sensor system, or in communication with an HMD active sensor system. In some embodiments, the beacon is attachable to a top portion of a display such as a television being used to display virtual reality. In other embodiments, the active sensor system 1204 comprises a plurality of beacons in order to track the passive controller system within a larger predetermined range 1210 or to accommodate for line-of-sight interruptions within the user's environment.

Figure 12C:
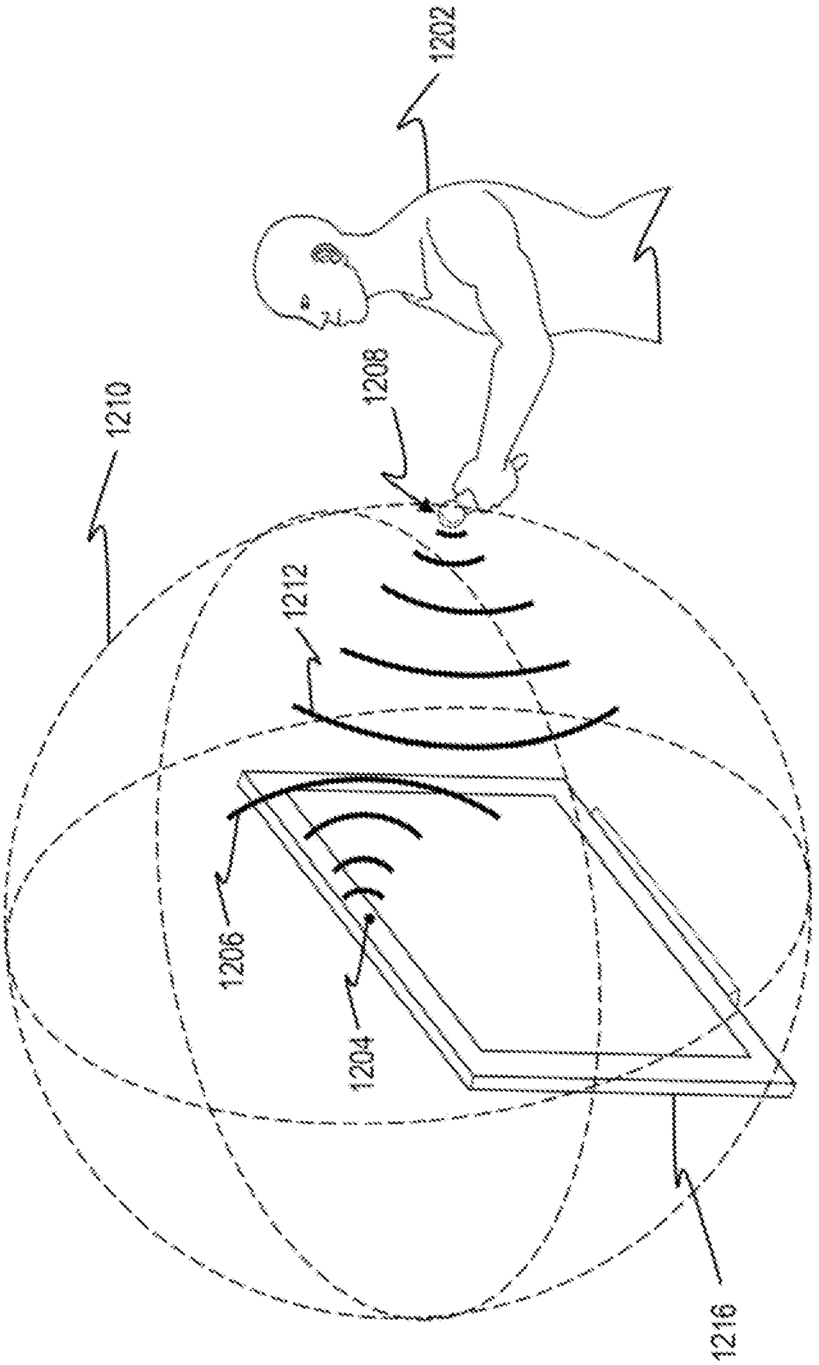
FIG. 12C illustrates an example embodiment of a signal being generated from an active sensor system on a smart television and being reflected to the active sensor system by a passive controller system.

Attention will now be directed to FIG. 12C, which illustrates an example embodiment of a signal being generated from an active sensor system on a smart television and being reflected to the active sensor system by a passive controller system. FIG. 12B shows a user 1202 using a passive controller system 1208 configured as a remote control for a smart television 1216 or another similar type of interactive display system.

As shown, smart television 1216 is equipped with an active sensor system 1204. The active sensor system 1204 is configured to transmit one or more signals 1206 that are reflect-able back to the active sensor system 1204 (see reflected signal 1212) by a passive controller system 1208 being maneuvered by the user 1202 within a predetermined range 1210 relative to the active sensor system 1204. In this manner, the user 1202 is able to control various functions of the smart television 1216 by maneuvering the television remote (i.e., passive controller system 1208), for example, to move a selection cursor on the screen of the smart television. Sometimes, movements of the remote are associated with known gesture patterns and predetermined inputs/actions that the system processes in response to detecting the gesture(s) caused by the movement of the passive remote.

The active sensor system 1204 is able to interpret reflected radar signals from the television remote as input to execute the different functionality of the smart television 1216 such that the user 1202 does have to press any buttons on the television remote in order to move the selection cursor and/or interact with interactive display elements that are displayed on the smart television 1216, such as, for example, in response to detected movements and/or gestures caused by movement of the passive remote within the range of reflectivity associated with the active sensor system 1204. For instance, the active sensor system 1204 is able to interpret patterns of reflected radar signals that are reflected back based on a particular movement or sequence of movement of the passive controller system 1208 and execute functionality of the smart television that corresponds to the movement or sequence of movements.

It should be appreciated that while the active sensor system 1204 is illustrated as part of a smart television system, the active sensor system 1204 can be integrated into various devices, such as game consoles, personal computers, laptops, tablets, smartphones, drones, or other devices, wherein the passive controller system 1208 is used, in similar manner as illustrated in FIG. 11C, to control movements and inputs associated with cursors and other control elements of the different device(s).

Figure 13:
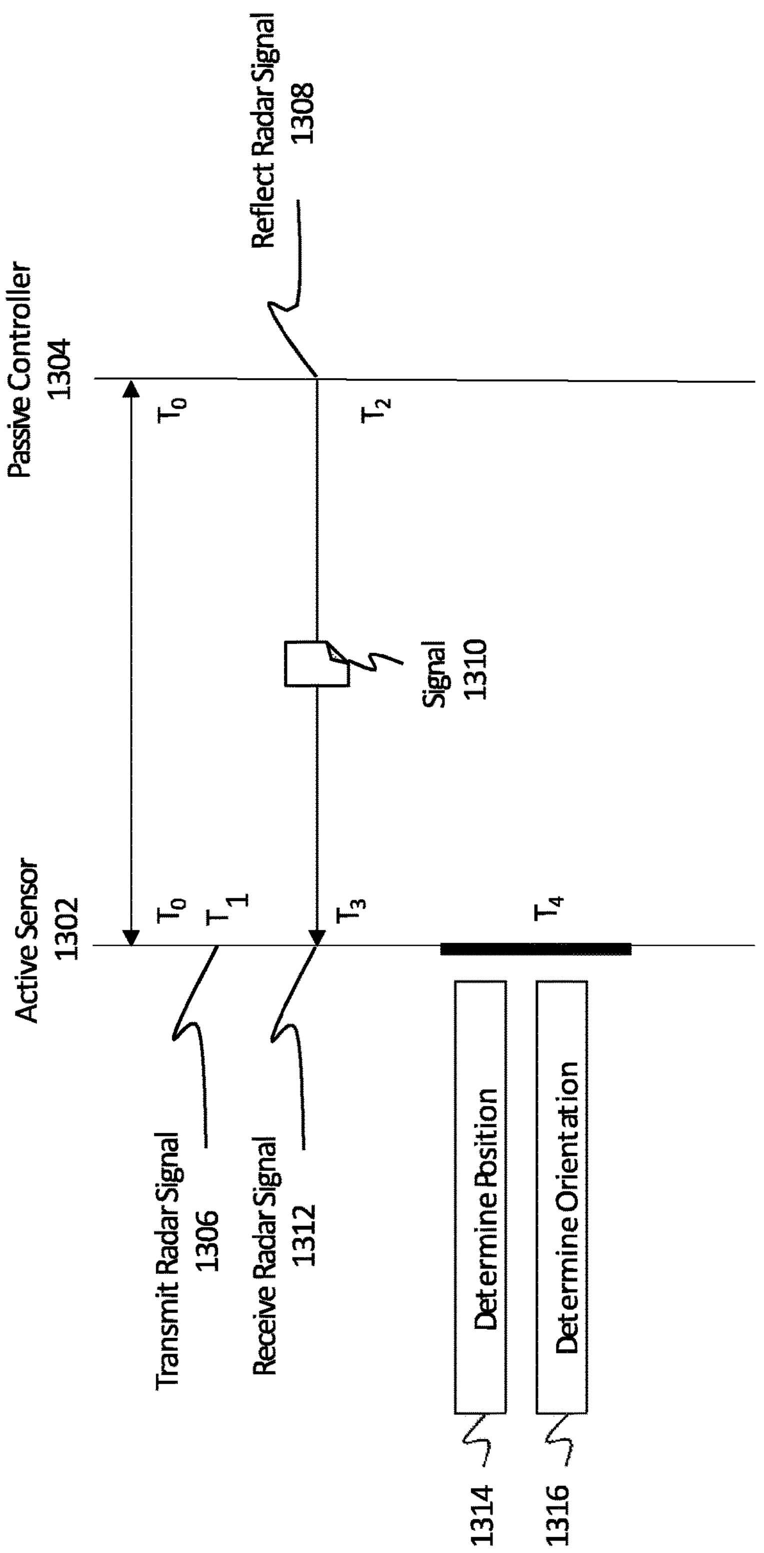
FIG. 13 illustrates another example embodiment of a process flow diagram for tracking a passive controller system using an active sensor system.

Attention will now be directed to FIG. 13, which illustrates another example embodiment of a process flow diagram for tracking a passive controller system using an active sensor system. For example, an active sensor 1302 is configured to transmit a radar signal 1306 in a direction that will reach the passive controller 1304 within a particular distance from the active sensor (e.g., transmit radar signal 1306). Irrespective of the position and/or orientation of the passive controller 1304 within the particular distance, the passive controller 1304 is configured to reflect the radar signal 1310 (e.g., reflect radar signal 1308). The active sensor 1302 then receives the reflected radar signal (e.g., receive radar signal 1312). Based on the transmitted radar signal and the received radar signal, the active sensor 1302 is configured to determine the position (e.g., determine position 1314) and determine the orientation (e.g., determine orientation 1316) of the passive controller system relative to the active sensor 1302.

Figure 14:
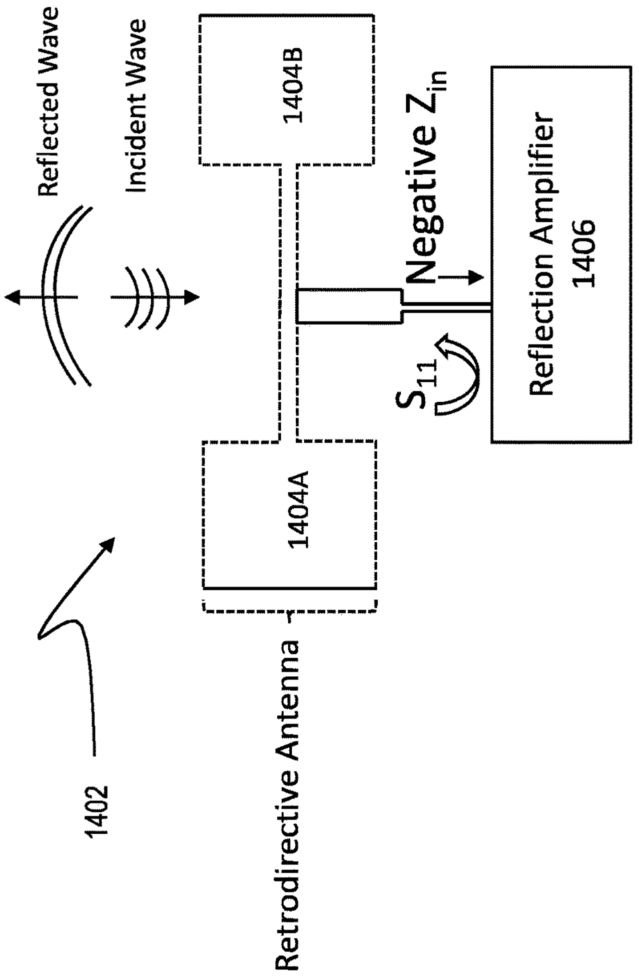
FIG. 14 illustrates an example embodiment of an active retrodirective antenna assembly.

Attention will now be directed to FIG. 14, which illustrates an example embodiment of an active retrodirective antenna array assembly that includes an amplifier. For example, active retrodirective antenna array assembly or unit 1402 comprises a plurality of retrodirective antenna arrays (array 1404A, array 1404B) electrically coupled with a reflection amplifier 1406. This creates an active circuit that is configured to increase the radar cross-section of the assembled antenna unit.

As shown in FIG. 14, S (the s parameter) is known as the reflection coefficient which is a parameter for characterizing the performance of the reflection amplifier according to Equation 1 and Equation 2. In Equation 2, Zl is device impedance and Zs is antenna impedance. The reflection amplifier is configured to ensure that the reflected power of the reflected wave will be will greater than the incidental power of the incident wave. Because reflected power is greater than incidental power, the S parameter becomes greater than 1, leading to the input impedance (e.g., Zin) of the assembly being negative. Thus, the active circuit will have negative resistance existing at the frequency of interest.

Some embodiments are also directed to active controller systems which comprise a controller body and an active retrodirective assembly mounted thereon. It should be appreciated that any passive controller system shown in the figures herein may be converted to an active controller system by replacing and/or adding an active retrodirective assembly to the controller body.

For example, in some instances, the retrodirective surface mount antenna array assembly or unit is mounted on a controller body configured to be held in a hand of a user and to be moved with the hand of the user in six degrees of freedom such that the active retrodirective surface mount antenna unit is capable of reflecting a radar signal with the retrodirective antenna array to a receiver that translates reflected signal from the retrodirective antenna array to determine a relative position and an orientation of the passive controller system relative to the receiver.

Additionally, or alternatively, in some instances, multiple active retrodirective surface mount antenna units are configured to form an active surface mount antenna assembly which is mountable to a controller body. In such instances, each retrodirective antenna array of the multiple active retrodirective surface mount units is mounted on the controller body at an angle offset from an adjacent retrodirective antenna array. Furthermore, in some instances, each retrodirective antenna array is tuned to a different frequency to cover broadband transmission or, alternatively, each array is tuned to the same frequency.

In view of the foregoing, it will be appreciated that the disclosed embodiments provide many technical benefits over conventional systems and methods for tracking a passive or active controller system using a retrodirective assembly comprising a plurality of retrodirective antenna arrays configured to reflect a radio frequency signal to a source of the radio frequency signal. Disclosed embodiments beneficially provide for a device tracking system, including a multiple retrodirective surface mount antenna assembly, which is tunable to different frequencies and different angles of reflection, while simultaneously providing a large radar cross section and a small overall device footprint. Additionally, the assembly is able to be mounted (i.e., retrofit) on existing controller bodies or provided as part of a new controller system.

As a further improvement over conventional systems, some embodiments comprise an active retrodirective assembly, wherein a reflection amplifier electrically coupled to one or more retrodirective antenna arrays of the assembly further increases the radar cross-section of the assembly to provide improved tracking capabilities.

Example Computer/Computer Systems

Figure 15:
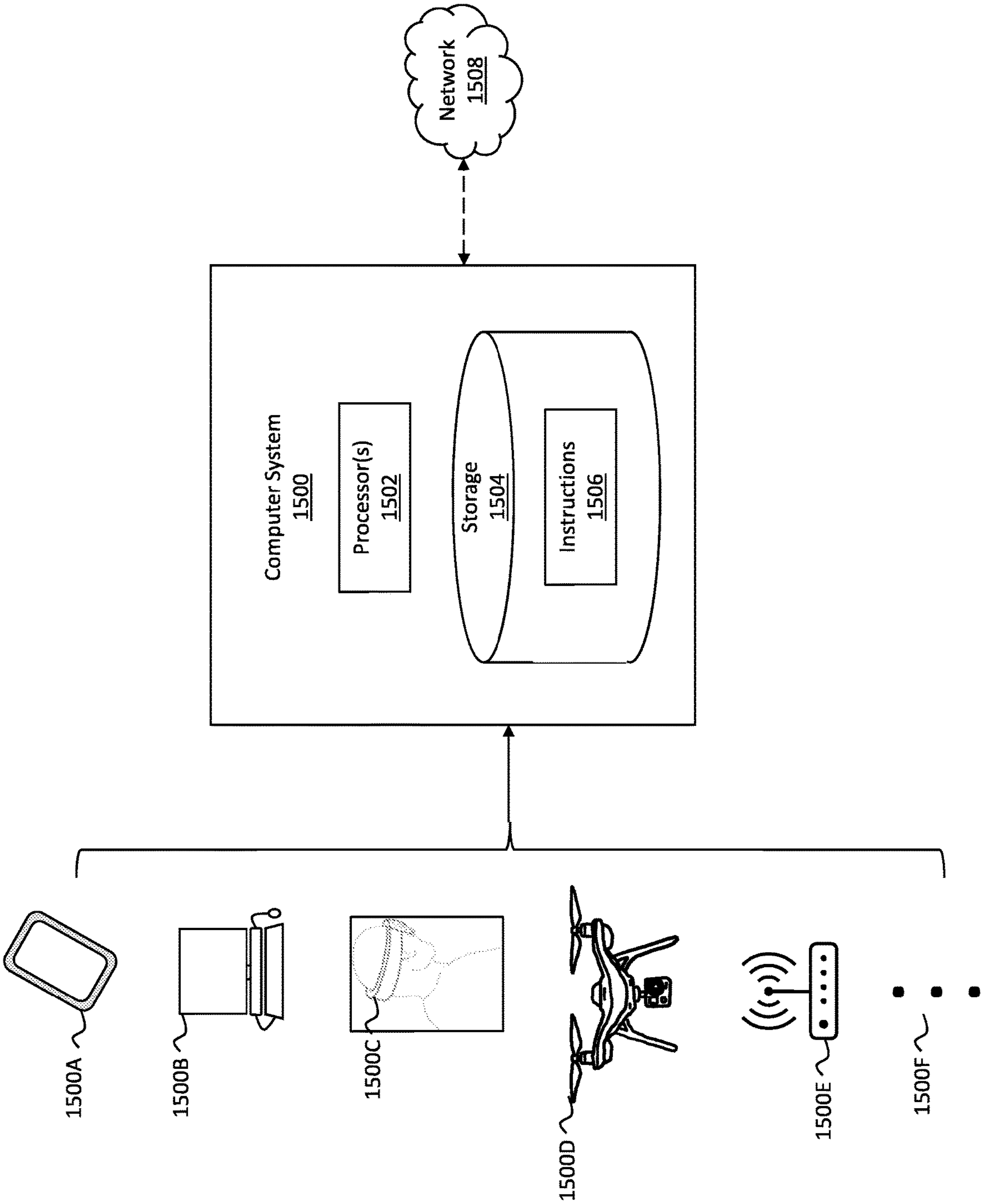
FIG. 15 illustrates an example architecture that includes a computing system that is capable of being utilized to implement the disclosed embodiments.

Attention will now be directed to FIG. 15 which illustrates an example computer system 1500 that may include and/or be used to perform any of the operations described herein. Computer system 1500 may take various forms. For example, computer system 1500 may be embodied as a tablet 1500A, a desktop or a laptop 1500B, a wearable device (e.g., head-mounted device 1500C), a drone 1500D, a vehicle or other mobile device (e.g., the active sensor system is able to be moved and guided through a space), a beacon 1500E (e.g., the active sensor system is external to a mixed-reality headset), a mixed-reality system device, and/or any other device, as illustrated by the ellipsis 1500F.

Computer system 1500 may also be configured as a standalone device or, alternatively, as a distributed system that includes one or more connected computing components/devices that are in communication with computer system 1500.

In its most basic configuration, computer system 1500 includes various components. FIG. 15 shows that computer system 1500 includes one or more processor(s) 1502 (aka a "hardware processing unit") and storage 1504.

Regarding the processor(s) 1502, it will be appreciated that the functionality described herein can be performed, at least in part, by one or more hardware logic components (e.g., the processor(s) 1502). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1500. The different components, modules, engines, and services described herein may be implemented as objects or processors that execute on computer system 1500 (e.g., as separate threads).

Storage 1504 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1504 is shown as including executable instructions 1506. The executable instructions 1506 represent instructions that are executable by the processor(s) 1502 of computer system 1500 to perform the disclosed operations, such as those described in the various methods.

The disclosed embodiments may comprise or utilize a special-purpose or general-purpose computer including computer hardware, such as, for example, one or more processors (such as processor(s) 1502) and system memory (such as storage 1504), as discussed in greater detail below. Embodiments also include physical and other computer-readable media for carrying or storing computer-executable instructions and/or data structures. Such computer-readable media can be any available media that can be accessed by a general-purpose or special-purpose computer system.

Computer-readable media that store computer-executable instructions in the form of data are physical or hardware computer storage media or device(s). Computer-readable media that merely carry computer-executable instructions are transitory media or transmission media. Thus, by way of example and not limitation, the current embodiments can comprise at least two distinctly different kinds of computer-readable media: (1) computer-readable hardware storage media and (2) transitory transmission media that does not include hardware storage.

The referenced computer storage device(s) (aka "hardware storage device(s)") comprise hardware storage components/devices, such as RAM, ROM, EEPROM, CD-ROM, solid state drives ("SSD") that are physical and tangible and that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer and which are distinguished from mere carrier waves and signals.

Computer system 1500 may also be connected (via a wired or wireless connection) to external sensors (e.g., one or more remote cameras) or devices via a network 1508. For example, computer system 1500 can communicate with any number of devices or cloud services to obtain or process data. In some cases, network 1508 may itself be a cloud network. Furthermore, computer system 1500 may also be connected through one or more wired or wireless networks 1508 to remote/separate computer systems(s) that are configured to perform any of the processing described with regard to computer system 1500.

A "network," like network 1508, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with network 1508. Transmission media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A controller system comprising:

a body configured to be held in a hand of a user and to be moved with the hand of the user in six degrees of freedom;

a first multiple retrodirective surface mount antenna assembly comprising a first plurality of retrodirective antenna arrays, wherein each retrodirective antenna array in the first plurality of retrodirective antenna arrays is mounted on a surface of the body with a first angular offset from at least one other retrodirective antenna array in the first plurality of retrodirective antenna arrays;

a second multiple retrodirective surface mount antenna assembly comprising a second plurality of retrodirective antenna arrays, wherein each retrodirective antenna array in the second plurality of retrodirective antenna arrays is mounted on the surface of the body with a second angular offset from at least one other retrodirective antenna array in the second plurality of retrodirective antenna arrays; and a reflection amplifier that is electrically coupled with at least one of the first plurality of retrodirective antenna arrays and the second plurality of retrodirective antenna arrays, wherein a reflected power associated with a reflected radar signal is greater than an incident power corresponding to an incident radar signal that is received by the at least one of the first plurality of retrodirective antenna arrays and the second plurality of retrodirective antenna arrays as a result of use of the reflection amplifier, wherein:

the first plurality of retrodirective antenna arrays are structured in a first configuration in which at least one distal edge of each retrodirective antenna array in the first plurality of retrodirective antenna arrays is in direct contact with an edge of another retrodirective antenna array in the first plurality of retrodirective antenna arrays, at least two of the retrodirective antenna arrays are structured to provide overlapping radar signal reflection surface areas, such that the at least two retrodirective antenna arrays are redundant relative to one another in that they have overlapping surface areas, the second plurality of retrodirective antenna arrays are structured in a second configuration in which at least one distal edge of each retrodirective antenna array in the second plurality of retrodirective antenna arrays is in direct contact with an edge of another retrodirective antenna array in the second plurality of retrodirective antenna arrays, and the direct contact between the edges imposed by the first and second configurations enable the first and second multiple retrodirective surface mount antenna assemblies to simultaneously fit on an available surface area of the body.

2. The controller system of claim 1, wherein each retrodirective antenna array comprises a rectangular shape having two elongated edges and two distal edges.

3. The controller system of claim 2, wherein the first plurality of retrodirective antenna arrays comprises a first retrodirective antenna array comprising a first distal edge and a second distal edge, a second retrodirective antenna array attached to the first distal edge of the first retrodirective antenna array at a first offset angle, and a third retrodirective antenna array attached to the second distal edge of the first retrodirective antenna array at a second offset angle.

4. The controller system of claim 3, wherein the first offset angle and the second offset angle each comprise approximately ten degrees.

5. The controller system of claim 1, wherein at least one retrodirective antenna array is tuned to a different frequency than another retrodirective antenna array.

6. The controller system of claim 1, wherein each retrodirective antenna array comprises different-sized unit cell structures.

7. The controller system of claim 1, wherein the controller system omits any inertial measurement units (IMUs) and is capable of reflecting a radar signal with the first or second plurality of retrodirective antenna arrays while in a plurality of different positions associated with the six degrees of freedom to a receiver that translates the reflected radar signal from the first or second plurality of retrodirective antenna arrays to determine a relative position and an orientation of the controller system relative to the receiver.

8. The controller system of claim 1, wherein the first or second plurality of retrodirective antenna arrays is mounted on the body in a configuration that provides at least 180 degrees of reflecting surface.

9. The controller system of claim 1, further comprising:

one or more additional multiple retrodirective surface mount antenna assemblies mounted to the body of the controller.

10. The controller system of claim 1, wherein each retrodirective antenna array has a same surface area and dimensional size.

11. A controller system comprising:

a housing comprising a handheld portion and a top portion, wherein:

the handheld portion is structured to be held in a hand of a user, the housing is moveable with the hand of the user in six degrees of freedom, and the top portion has a surface;

a first multiple retrodirective surface mount antenna assembly comprising a first plurality of retrodirective antenna arrays, wherein each retrodirective antenna array in the first plurality of retrodirective antenna arrays is included in the top portion with a first angular offset from at least one other retrodirective antenna array in the first plurality of retrodirective antenna arrays;

a second multiple retrodirective surface mount antenna assembly comprising a second plurality of retrodirective antenna arrays, wherein each retrodirective antenna array in the second plurality of retrodirective antenna arrays is included in the top portion with a second angular offset from at least one other retrodirective antenna array in the second plurality of retrodirective antenna arrays; and a reflection amplifier that is electrically coupled with at least one of the first plurality of retrodirective antenna arrays and the second plurality of retrodirective antenna arrays, wherein a reflected power associated with a reflected radar signal is greater than an incident power corresponding to an incident radar signal that is received by the at least one of the first plurality of retrodirective antenna arrays and the second plurality of retrodirective antenna arrays as a result of use of the reflection amplifier, wherein:

the first plurality of retrodirective antenna arrays are structured in a first configuration in which at least one distal edge of each retrodirective antenna array in the first plurality of retrodirective antenna arrays is in direct contact with an edge of another retrodirective antenna array in the first plurality of retrodirective antenna arrays, at least two of the retrodirective antenna arrays are structured to provide overlapping radar signal reflection surface areas, such that the at least two retrodirective antenna arrays are redundant relative to one another in that they have overlapping surface areas, the second plurality of retrodirective antenna arrays are structured in a second configuration in which at least one distal edge of each retrodirective antenna array in the second plurality of retrodirective antenna arrays is in direct contact with an edge of another retrodirective antenna array in the second plurality of retrodirective antenna arrays, and the direct contact between the edges imposed by the first and second configurations enable the first and second multiple retrodirective surface mount antenna assemblies to simultaneously fit on an available area of the top portion.

12. The controller system of claim 11, wherein the top portion is semi-spherical in shape.

13. The controller system of claim 12, wherein the first and second angular offsets enable the first and second multiple retrodirective surface mount antenna assemblies to curve around the semi-spherical shape of the top portion.

14. The controller system of claim 12, wherein a plurality of multiple retrodirective surface mount antenna assemblies, which include the first and second multiple retrodirective surface mount antenna assemblies, are contoured around the semi-spherical shape of the top portion, resulting in 360 degree coverage.

15. The controller system of claim 11, wherein the first and second multiple retrodirective surface mount antenna assemblies curve around an outer surface of the top portion.

16. The controller system of claim 11, wherein the first and second multiple retrodirective surface mount antenna assemblies are embedded within the top portion such that the first and second multiple retrodirective surface mount antenna assemblies are not curved around an outer surface of the top portion.

17. The controller system of claim 11, wherein the top portion is made of a non-reflective material.

18. The controller system of claim 17, wherein the first and second multiple retrodirective surface mount antenna assemblies are mounted on an inside surface of the top portion.

19. The controller system of claim 11, wherein the first and second multiple retrodirective surface mount antenna assemblies reflect signals received through the top portion.

20. The controller system of claim 11, wherein the top portion further includes a user control.

* * * * *